United States Patent [19]
Swindler et al.

[11] Patent Number: 6,089,086
[45] Date of Patent: Jul. 18, 2000

[54] LIQUID LEVEL GAUGE

[75] Inventors: Danny E. Swindler, Round Rock, Tex.;
Amber N. Dudley, Kansas City, Kans.;
Herbert G. Ross, Jr., Argyle, Tex.

[73] Assignee: Rochester Gauges, Inc., Dallas, Tex.

[21] Appl. No.: 09/109,437

[22] Filed: Jul. 2, 1998

Related U.S. Application Data

[63] Continuation-in-part of application No. 08/918,951, Aug. 26, 1997.

[51] Int. Cl.[7] .................................................. G01F 23/28
[52] U.S. Cl. .......................... 73/317; 73/305; 73/DIG. 5
[58] Field of Search ...................... 73/305, 317, DIG. 5; 116/229

[56] References Cited

U.S. PATENT DOCUMENTS

| | | | |
|---|---|---|---|
| Re. 33,555 | 3/1991 | Draft | 141/198 |
| Re. 34,679 | 8/1994 | Ritzenthaler et al. | 73/317 |
| D. 313,949 | 1/1991 | Fekete | D10/101 |
| 1,316,341 | 9/1919 | Vosika . | |
| 2,578,104 | 12/1951 | Taylor | 73/317 |
| 2,584,446 | 2/1952 | Hastings et al. | 73/317 |
| 2,697,350 | 12/1954 | Sorber | 73/317 |
| 2,760,373 | 8/1956 | Quist | 73/317 |
| 2,992,560 | 7/1961 | Morgan et al. | 73/317 |
| 3,320,806 | 5/1967 | Johnson et al. | 73/317 |
| 3,463,843 | 8/1969 | Taylor et al. | 264/68 |
| 3,632,925 | 1/1972 | Fujiwara | 200/84 C |
| 3,638,493 | 2/1972 | Schoepflin | 73/317 |
| 3,683,628 | 8/1972 | Tabary | 61/0.5 |
| 3,686,451 | 8/1972 | Pottharst, Jr. et al. | 200/84 R |
| 3,688,795 | 9/1972 | Taylor | 137/558 |
| 3,709,038 | 1/1973 | Werner | 73/313 |
| 3,739,641 | 6/1973 | Taylor et al. | 73/313 |
| 3,925,747 | 12/1975 | Woodward et al. | 338/33 |
| 3,956,903 | 5/1976 | Cranage | 128/276 |
| 3,968,896 | 7/1976 | Giacoletti et al. | 220/63 R |
| 3,989,898 | 11/1976 | Dugan et al. | 179/2 AM |
| 4,001,644 | 1/1977 | Lingenfelter et al. | 317/14 G |
| 4,034,608 | 7/1977 | Vincent | 73/313 |

(List continued on next page.)

OTHER PUBLICATIONS

Rochester Gauges, Inc., Magnetic Liquid–Level Gauges for LP–Gas Service, 7200 Series, Technical Data Sheet, 2 pages, May 27, 1992.

Rochester Gauges, Inc., Industrial Liquid Level Gauges, Specifications Brochure, 12 pages, Aug. 1993.

*Primary Examiner*—Hezron Williams
*Assistant Examiner*—Willie Morris Worth
*Attorney, Agent, or Firm*—Sidley & Austin

[57] ABSTRACT

A float-type liquid level gauge is provided for measuring the level of a liquid such as LPG within a horizontally oriented cylindrical tank (228). The gauge includes a movable pivot arm (212) supporting a float arm assembly (225) and coupled by gears (207, 214) to a magnet shaft (206, 208) and magnet (210) mounted in a rigid support arm (204) through a sideways-securing shaft channel(209). The support arm is connected to the lower side of a gauge head (202) and the magnet extends into a passage (52) in the gauge head so as to be magnetically coupled to a level indicating dial (226) provided on the upper side of the gauge head. The lower portion (302) of the support arm is angled and offset with respect to a longitudinal axis (265) such that a high ratio can be obtained between the gears while still permitting the components of the gauge to pass through the opening of a standard pressure fitting (234).

41 Claims, 18 Drawing Sheets

U.S. PATENT DOCUMENTS

| | | | |
|---|---|---|---|
| 4,038,507 | 7/1977 | Murphy, Jr. et al. | 200/84 R |
| 4,055,085 | 10/1977 | Wetterhorn | 73/418 |
| 4,078,430 | 3/1978 | Pemberton et al. | 73/311 |
| 4,107,998 | 8/1978 | Taylor | 73/313 |
| 4,114,130 | 9/1978 | Sutton et al. | 338/33 |
| 4,116,062 | 9/1978 | Relp | 73/321 |
| 4,126,040 | 11/1978 | Varacins et al. | 73/293 |
| 4,157,038 | 6/1979 | Yamamoto | 73/313 |
| 4,181,021 | 1/1980 | Harris et al. | 73/317 |
| 4,183,176 | 1/1980 | Barfield | 47/79 |
| 4,220,047 | 9/1980 | Mauboussin | 73/313 |
| 4,229,973 | 10/1980 | Hara | 73/317 |
| 4,240,298 | 12/1980 | Wetterhorn | 73/732 |
| 4,326,413 | 4/1982 | Takeshita et al. | 73/313 |
| 4,361,039 | 11/1982 | van der Lely | 73/313 |
| 4,362,056 | 12/1982 | Lee | 73/317 |
| 4,397,183 | 8/1983 | Ballou et al. | 73/293 |
| 4,402,209 | 9/1983 | Di Domenico | 73/1 H |
| 4,441,364 | 4/1984 | Montie | 73/313 |
| 4,444,057 | 4/1984 | Wetterhorn | 73/739 |
| 4,483,367 | 11/1984 | Ross, Jr. et al. | 137/416 |
| 4,507,961 | 4/1985 | Stradella | 73/317 |
| 4,532,491 | 7/1985 | Rau et al. | 338/33 |
| 4,539,270 | 9/1985 | Mejia | 429/91 |
| 4,547,916 | 10/1985 | Henke et al. | 4/300 |
| 4,557,144 | 12/1985 | Lucchini | 73/313 |
| 4,570,823 | 2/1986 | Arabian et al. | 222/26 |
| 4,574,631 | 3/1986 | Johnson, Jr. | 73/317 |
| 4,600,820 | 7/1986 | Bruder et al. | 200/84 C |
| 4,610,165 | 9/1986 | Duffy et al. | 73/317 |
| 4,617,802 | 10/1986 | Fiedler | 62/125 |
| 4,627,378 | 12/1986 | Manness et al. | 116/229 |
| 4,630,443 | 12/1986 | Steer | 60/535 |
| 4,635,480 | 1/1987 | Hrncir et al. | 73/322.5 |
| 4,641,122 | 2/1987 | Hennequin | 338/33 |
| 4,668,254 | 5/1987 | Wamsley, Jr. | 55/196 |
| 4,671,121 | 6/1987 | Schieler | 73/317 |
| 4,688,028 | 8/1987 | Conn | 340/625 |
| 4,699,003 | 10/1987 | Harde | 73/313 |
| 4,706,707 | 11/1987 | Betterton et al. | 137/565 |
| 4,746,776 | 5/1988 | Komaniak | 200/84 |
| 4,752,019 | 6/1988 | Walker | 222/51 |
| 4,778,957 | 10/1988 | Crowell | 200/84 R |
| 4,790,184 | 12/1988 | Nakanishi et al. | 73/317 |
| 4,790,185 | 12/1988 | Fedelem et al. | 73/317 |
| 4,807,472 | 2/1989 | Brown et al. | 73/713 |
| 4,821,571 | 4/1989 | Reymond | 73/317 |
| 4,825,695 | 5/1989 | Ohtani | 73/290 R |
| 4,841,771 | 6/1989 | Glover et al. | 73/317 |
| 4,845,486 | 7/1989 | Knight et al. | 340/618 |
| 4,848,150 | 7/1989 | Baird et al. | 73/296 |
| 4,848,151 | 7/1989 | Bruder et al. | 73/308 |
| 4,850,222 | 7/1989 | Motoki et al. | 73/317 |
| 4,870,861 | 10/1989 | Ohtani et al. | 73/317 |
| 4,873,865 | 10/1989 | Gaston | 73/317 |
| 4,911,011 | 3/1990 | Fekete et al. | 73/313 |
| 4,924,221 | 5/1990 | Filippone | 340/870.38 |
| 4,924,704 | 5/1990 | Gaston | 73/317 |
| 4,928,526 | 5/1990 | Weaver | 73/313 |
| 4,939,932 | 7/1990 | Ritzenthaler et al. | 73/317 |
| 4,986,124 | 1/1991 | Byrne et al. | 73/317 |
| 4,987,400 | 1/1991 | Fekete | 338/164 |
| 4,991,436 | 2/1991 | Roling | 73/320 |
| 5,000,044 | 3/1991 | Duffy et al. | 73/317 |
| 5,023,806 | 6/1991 | Patel | 364/509 |
| 5,027,871 | 7/1991 | Guenther | 141/198 |
| 5,035,141 | 7/1991 | Baird et al. | 73/296 |
| 5,048,333 | 9/1991 | Bonnell et al. | 73/290 R |
| 5,072,618 | 12/1991 | Taylor et al. | 73/317 |
| 5,083,461 | 1/1992 | Winkler | 73/317 |
| 5,085,078 | 2/1992 | Baux et al. | 73/313 |
| 5,117,693 | 6/1992 | Duksa | 73/317 |
| 5,152,170 | 10/1992 | Liu | 73/317 |
| 5,167,156 | 12/1992 | Tozawa | 73/317 |
| 5,216,919 | 6/1993 | Nelson et al. | 73/317 |
| 5,234,243 | 8/1993 | Howarth | 294/66.1 |
| 5,272,918 | 12/1993 | Gaston et al. | 73/290 R |
| 5,294,055 | 3/1994 | Baux et al. | 73/317 |
| 5,294,917 | 3/1994 | Wilkins | 340/625 |
| 5,301,550 | 4/1994 | Shortis | 73/322.5 |
| 5,305,639 | 4/1994 | Pontefract | 73/317 |
| 5,311,776 | 5/1994 | Morris | 73/306 |
| 5,333,499 | 8/1994 | Gaston | 73/317 |
| 5,341,679 | 8/1994 | Walkowski et al. | 73/317 |
| 5,357,815 | 10/1994 | Williamson | 73/866.3 |
| 5,369,395 | 11/1994 | Waller | 340/603 |
| 5,374,790 | 12/1994 | Horvath | 200/84 |
| 5,375,467 | 12/1994 | Banse | 73/290 |
| 5,425,271 | 6/1995 | Duksa | 73/317 |
| 5,426,271 | 6/1995 | Clark et al. | 200/84 |
| 5,431,047 | 7/1995 | Coha et al. | 73/317 |
| 5,479,820 | 1/1996 | Fekete | 73/319 |
| 5,661,238 | 8/1997 | Duksa | 73/317 |
| 5,666,851 | 9/1997 | Bacon | 73/317 |
| 5,678,449 | 10/1997 | Mollet et al. | 73/319 |
| 5,704,076 | 1/1998 | Olson | 4/325 |
| 5,708,424 | 1/1998 | Orlando et al. | 340/870.08 |

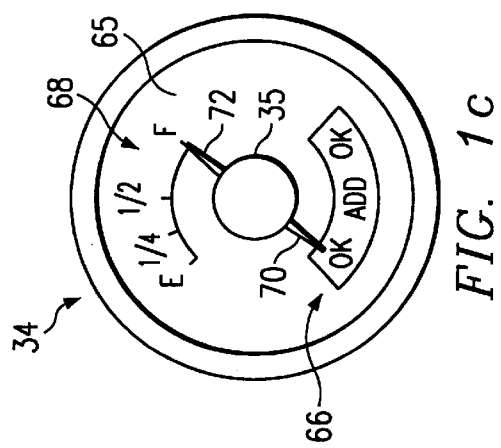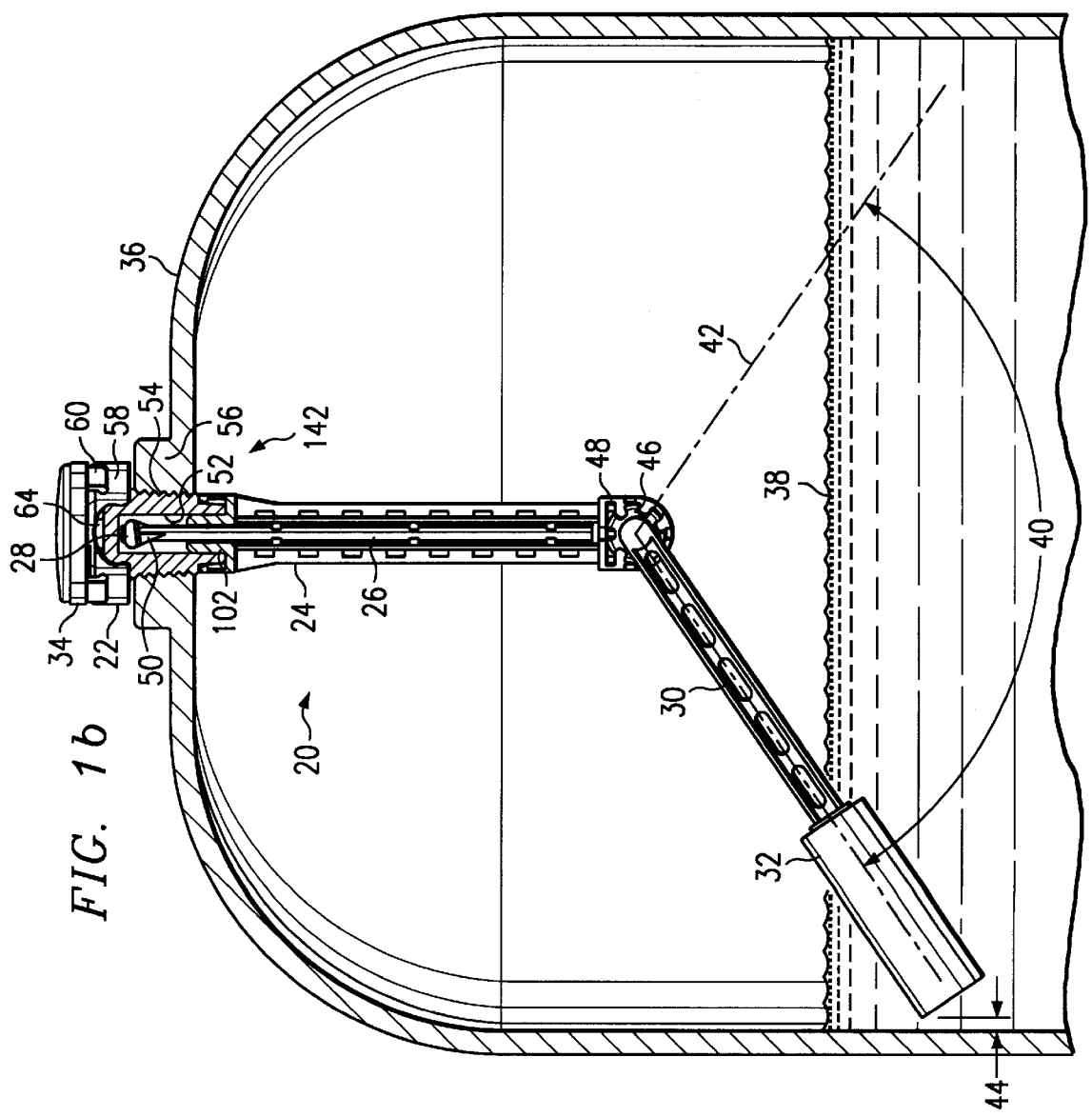

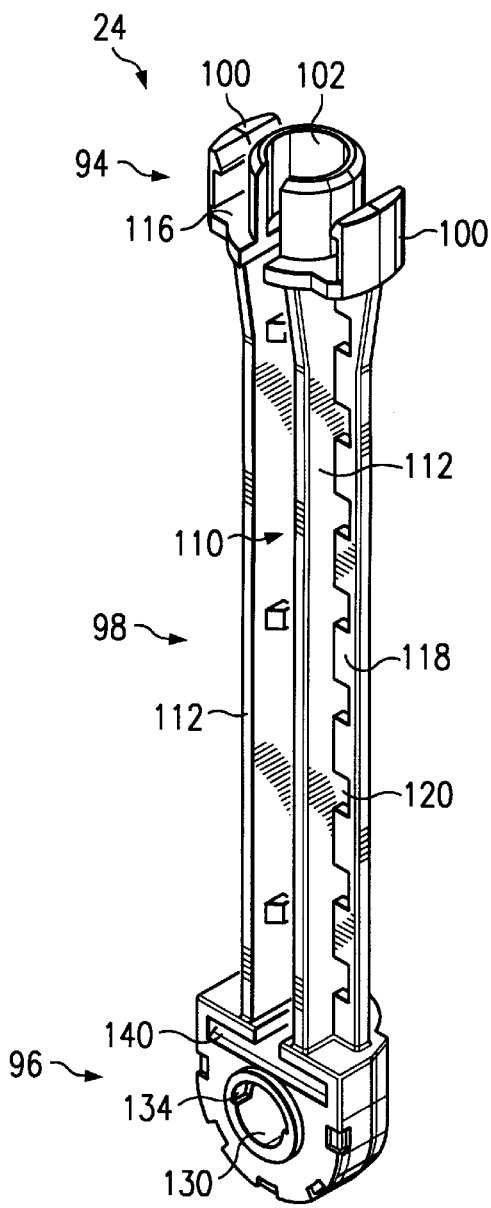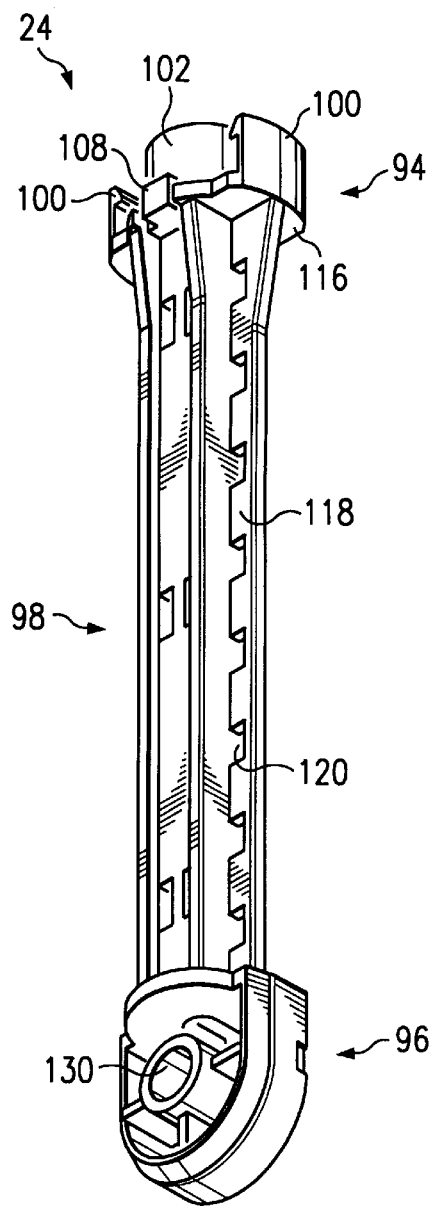
FIG. 11a       FIG. 11b
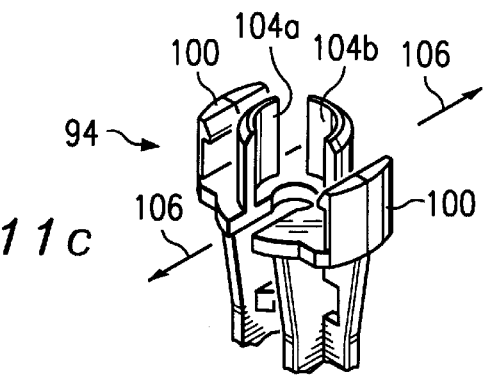
FIG. 11c

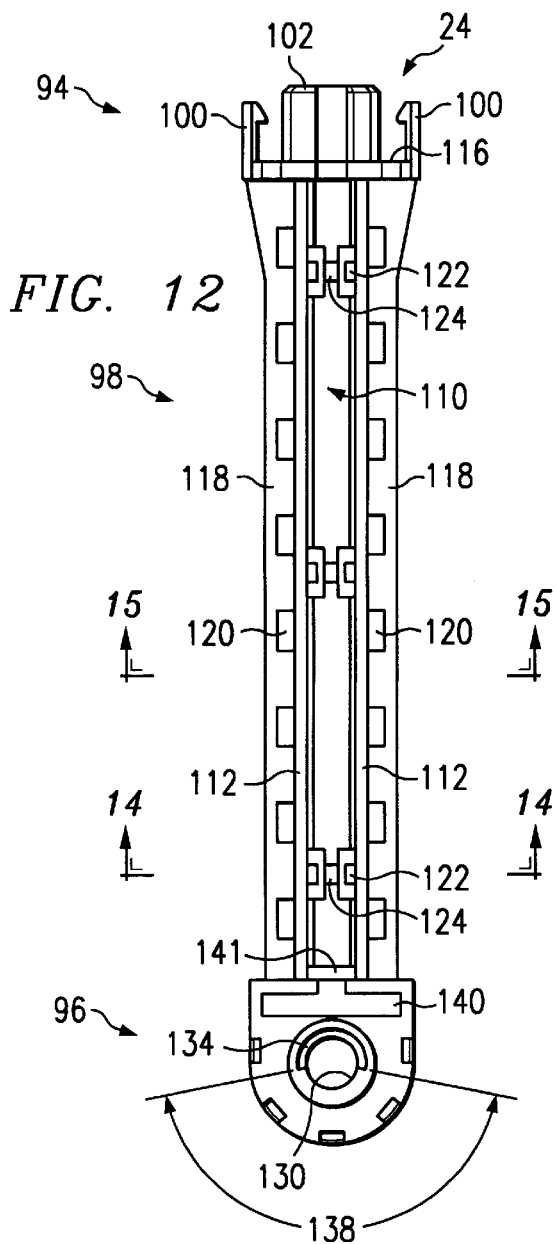
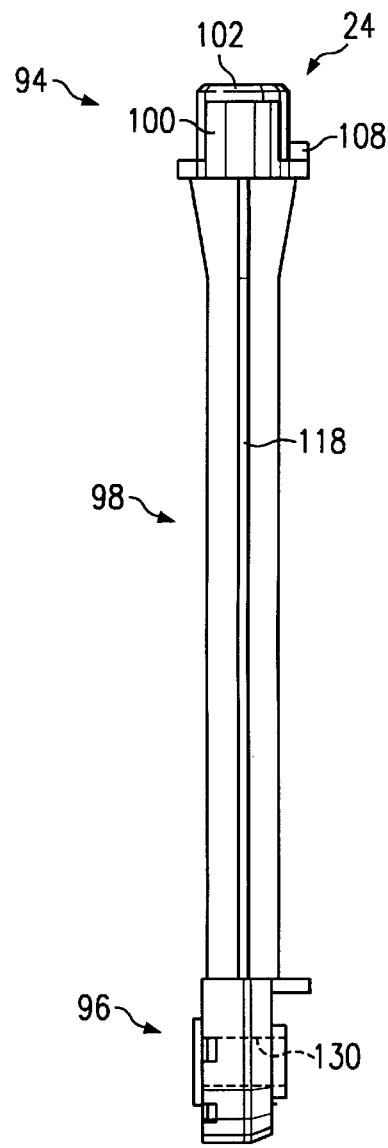
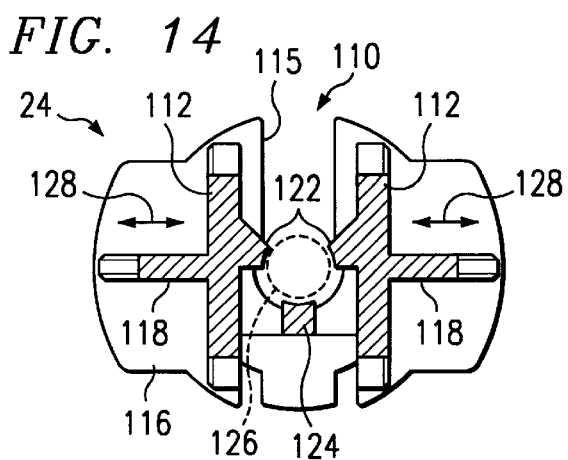
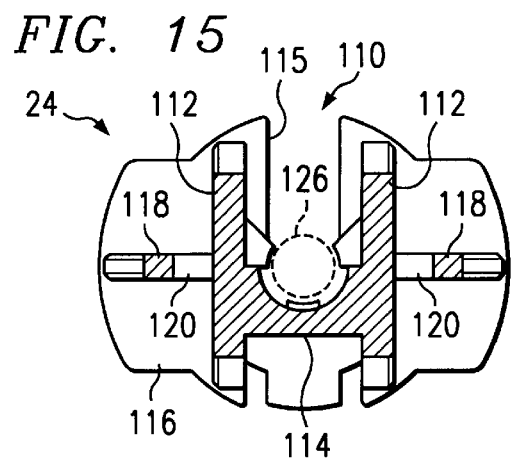
FIG. 12
FIG. 13
FIG. 14
FIG. 15

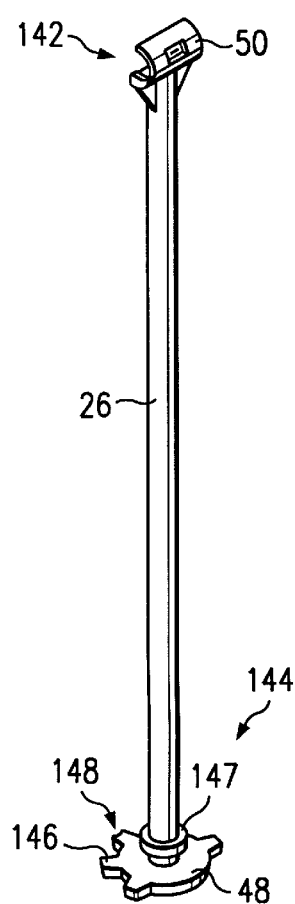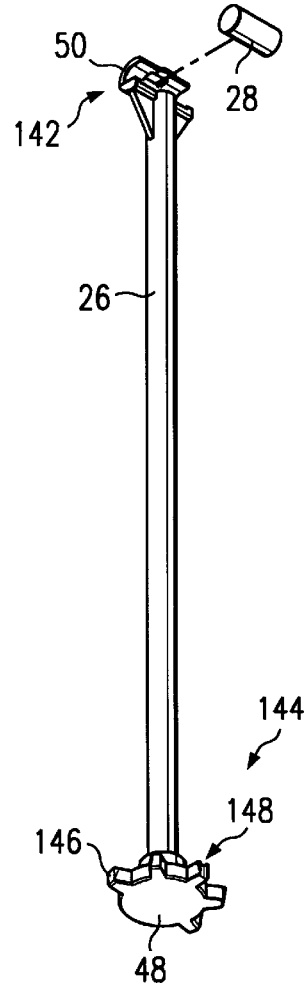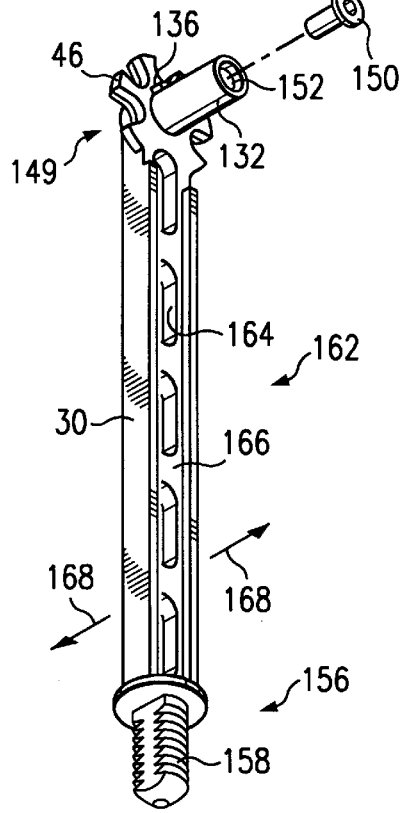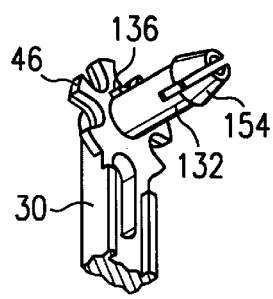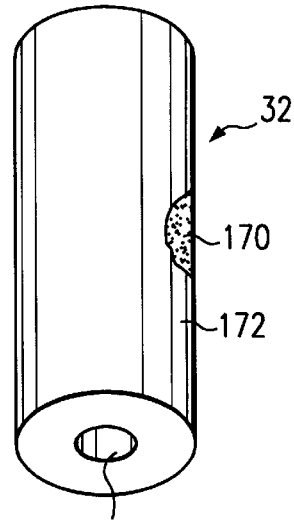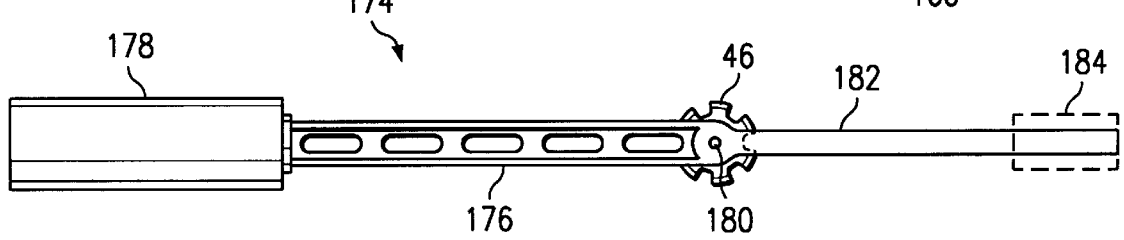

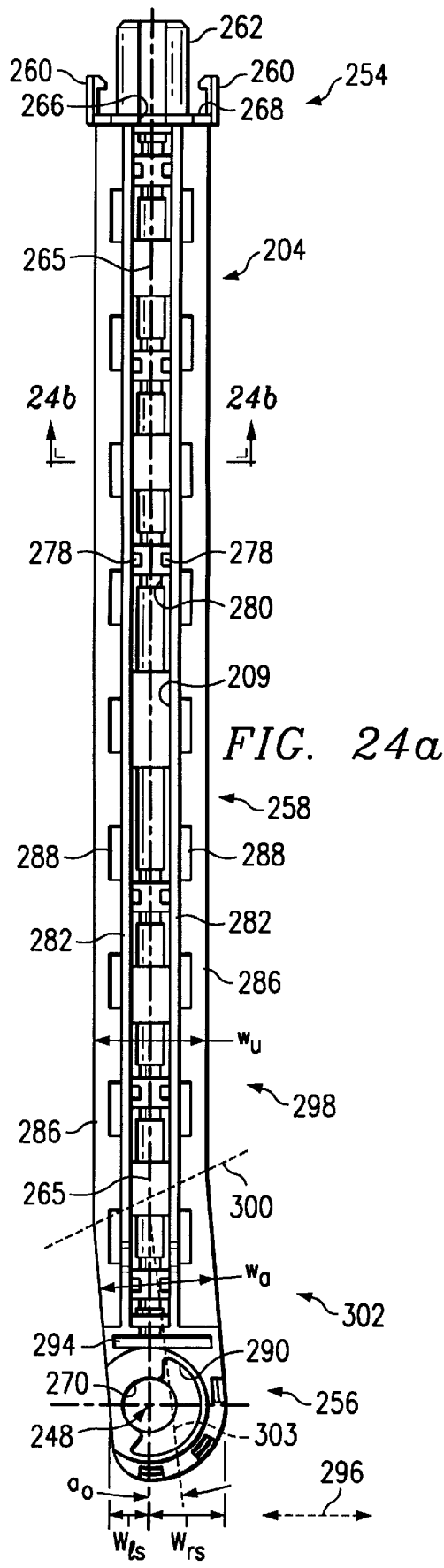
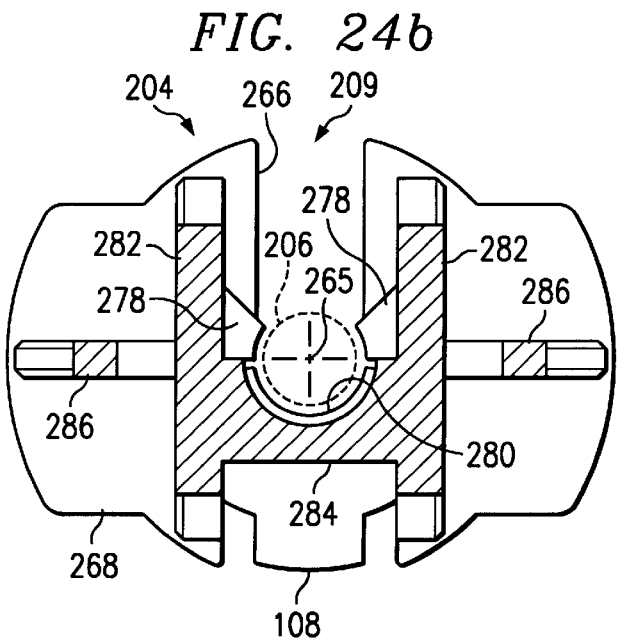
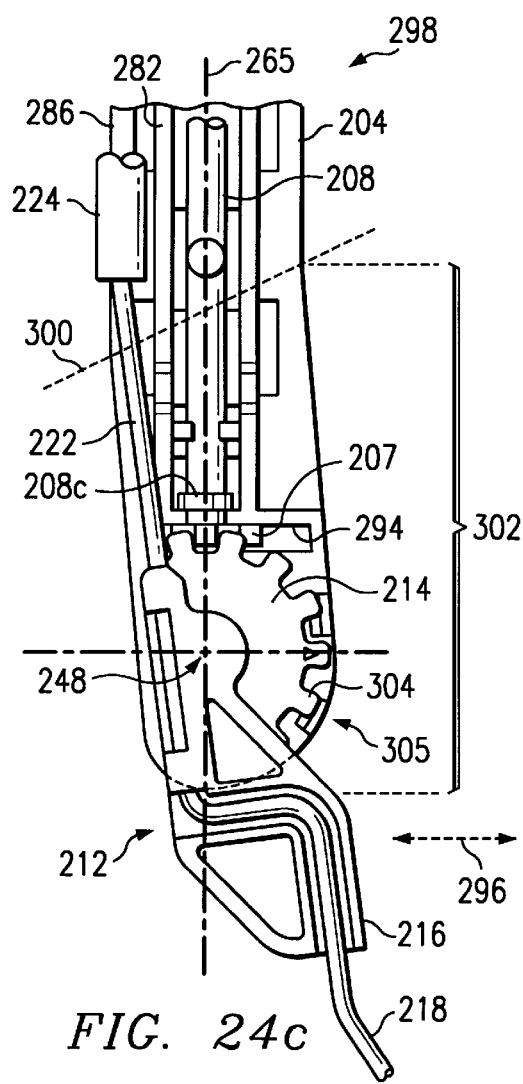
FIG. 24a
FIG. 24b
FIG. 24c

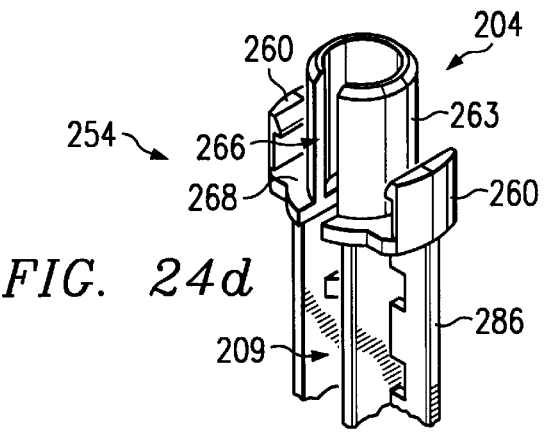
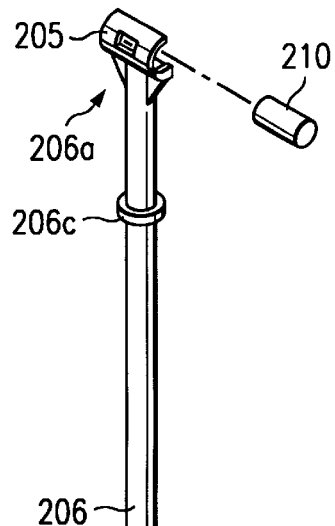
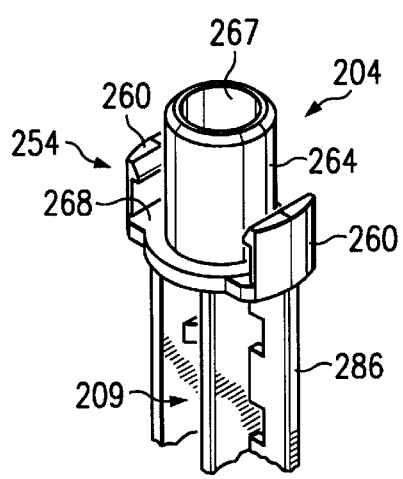
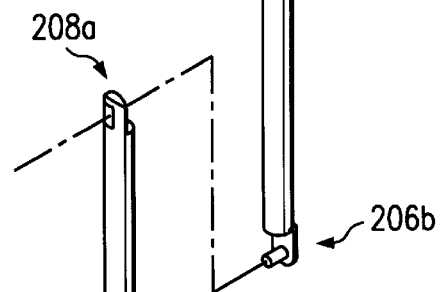
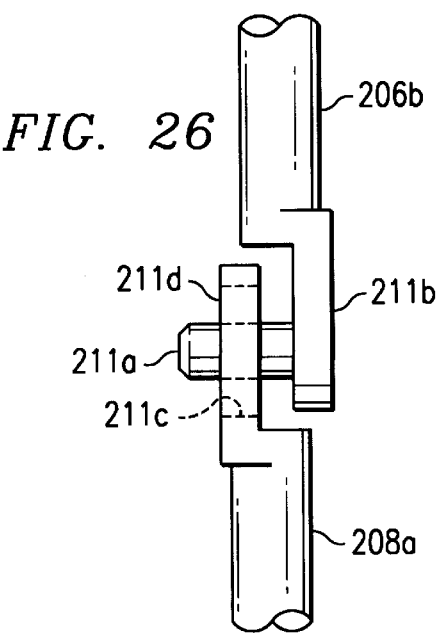

LIQUID LEVEL GAUGE

CROSS REFERENCE TO RELATED APPLICATIONS

This is a continuation-in-part of U.S. patent application Ser. No. 08/918,951, filed Aug. 26, 1997, hereby incorporated herein by reference.

TECHNICAL FIELD OF THE INVENTION

This invention relates to gauges for measuring the level of liquid in a tank. In one aspect, it relates to a float-type liquid level gauge for measuring the level of liquid in a tank containing a liquefied petroleum gas.

BACKGROUND OF THE INVENTION

Liquids of the liquefied petroleum gas type, such as propane, butane, and the like (often referred to generally as LPG), are commonly used for purposes such as residential or industrial heating, or for powering internal combustion engines on industrial vehicles such as lift trucks (i.e, fork lifts). The LPG is typically stored as a liquid under pressure in a tank or cylinder. A liquid level gauge may be provided on the tank for measuring the level of the liquid in the tank. In some applications such as lift trucks, the LPG cylinders are oriented horizontally while in use on the vehicle but are stored vertically when removed for refueling. In such applications, a liquid level gauge which can measure liquid levels in both orientations is desirable.

In other applications, for example, when an LPG storage tank is used to supply LP gas for the heating and/or energy needs of a house, mobile home, or business, the LPG tank is typically installed in a permanent location. In many regions, the dimensions of LPG tanks used in these stationary applications have become standardized in the form of cylinders having a diameter (measured perpendicular to their elongate axis) of 24 inches, 30 inches, 31.5 inches, 37 inches, 40.5 inches or 41 inches. In other regions, tank sizes approximating the standard sizes are used having a range of diameters from about 24 inches to about 42 inches. The tanks are usually installed on their side with their elongate axis horizontal. It is, of course, desirable to have a liquid level gauge which can indicate the level of LPG within such a stationary tank. In the case of a stationary tank, however, there is no need for the liquid level gauge to indicate the LPG level when the tank is in more than one orientation, as in the case of gauges for use with lift-truck cylinders. Instead, in the case of a stationary cylinder, it is desirable that the liquid level gauge accurately measure the level of LPG within the tank, especially when the LPG level is low, i.e., when the level in the tank equates to approximately 5% full, and when the LPG level is high, i.e., when the level in the tank equates to approximately 80% full. Further, it is desirable that the measured level of LPG be indicated with high angular resolution on the gauge dial. Accurate low level measurements are especially important to help the user avoid running out of LPG, while accurate high level measurements are especially important to help the user determine the level of LPG in a near-full tank. A high resolution indication of the measurement, i.e., where the angular distance between the 5% full mark and the 80% full mark on the gauge dial is at least 180°, allows the user to accurately determine the quantity of LPG remaining in the tank and/or the LPG consumption over time, thereby allowing the user to better estimate how soon the tank will need to be refilled.

Liquid level gauges for measuring the level of a liquid such as LPG inside a tank are disclosed in U.S. Pat. Nos. 2,992,560 and 3,688,735. These patents disclose float-type liquid level gauges that utilize a pivoting float arm having a position which is responsive to the liquid level inside the tank. The float arm is connected to a rotatable shaft by means of a geared mechanism, and the shaft is magnetically coupled to an external liquid level indicator. A change in liquid level causes the float arm to rotate the shaft, and the magnetic coupling then rotates the external indicator without requiring a direct physical connection. Thus, the possibility of volatile liquid or vapor leaking through the mechanism is eliminated.

While useful, the previously disclosed float-type gauges have several drawbacks. First, due to the low density of LPG, the heavy-walled hollow float used to resist the pressure in the tank has insufficient buoyancy to float without a counterweight to balance the float arm. Such counterweights are typically discrete components which add to the manufacture and assembly expense of the gauge, and their size often increases the difficulty in installing the gauge through the narrow opening of the tank or cylinder. For example, on many lift truck cylinders and tanks for recreational vehicles (RVs), the in-tank parts of the level gauge must fit through a ¾ inch opening. A need therefore exists, for a liquid level gauge which does not require a counterweight, or where the counterweight is a small, integral part of another component.

In stationary tank applications, a threaded pressure fitting having an opening about 1.13 inches in diameter is commonly provided on the upper surface of the tank for installation of a liquid level gauge. A magnetically-coupled float-type gauge is typically used for this purpose. While this pressure-fitting opening is somewhat larger than the ¾ inch diameter opening typically found on a lift truck cylinder, it still requires the that the float, float arm, support arm and other in-tank components of the gauge be configured to fit through an opening of that size. Furthermore, the in-tank components of the gauge must be configured to have clearance with the inner walls of the tank at all times. This includes clearance with the bottom of the tank when the float arm is hanging at the lowest, i.e., empty, position as well as clearance along the sides of the tank as the float arm pivots upwards. The side clearance is important not just during normal use of the gauge, but also as the gauge is being installed by screwing it into the threaded pressure fitting on the tank. It has been discovered that installers frequently spin the gauges at a rapid rate as they are being installed. This can cause the pivoting components of the gauge to swing outward to a significant angle with respect to vertically downward under centrifugal force. Unless the components are sized to ensure proper clearances, then the pivoting components may strike the inner walls of the tank (which can damage the gauge) during installation.

Simply providing clearance between the walls of a tank and the in-tank components of a liquid level gauge does not, however, ensure that the gauge can accurately measure the level of LPG in the tank. It is also necessary that the length of the gauge's support arm and the geometry of the gauge's float arm be properly selected for the dimensions of the tank. For example, if the support arm is too short (i.e., the pivot point is placed too high with respect to the center of the tank), a float arm with a length selected to permit the float to measure low LPG levels (near the 5% full level) will also allow the float to easily strike the inner wall of the cylinder if the gauge is spun during installation. On the other hand, if the support arm is too long (i.e., the pivot point is placed too low with respect to the center of the tank), a float arm length cannot be selected to permit the float to measure both low LPG levels (near the 5% full level) and high LPG levels (near the 80% full level) without causing excessive accuracy error.

To meet the dual requirements of internal clearance during installation and measurement accuracy at high and low LPG levels, most magnetically coupled liquid level gauges for use in stationary LPG tanks are single-size gauges, i.e., gauges constructed or assembled with a specific support arm working length (i.e., the distance from support arm top to the float arm pivot point) for each different size or diameter of LPG tank. The use of such single-size gauges, however, requires manufacturers, distributors, and suppliers of LPG gauges to manufacture and/or warehouse a large inventory of different gauge configurations and gauge components, a situation which leads to inconvenience and increased cost. A need therefore exists for a liquid level gauge that can be used in LPG service, that is suitable for screw-in installation through a hole having a diameter of about 1.13 inches, that provides a high-resolution magnetically-coupled indication of the LPG level, that provides good measurement accuracy at high and low LPG levels and that minimizes the changes required for use in LPG tanks having standard diameters ranging from about 24 inches to about 42 inches.

It is known to use liquid level gauges having an adjustably positionable pivot point on the support arm to reduce the number of different gauge components that must be manufactured and/or stocked to serve a range of different size tanks. For example, U.S. Pat. Nos. 4,671,121, 4,928,526 and 5,152,170 disclose liquid level gauges having float arm pivot assemblies that are adjustably positionable along a fixed-length support arm. However, the disclosed gauges still require float arms of different lengths for use in tanks of different heights. Further, the disclosed gauges do not provide a mechanical indication of the liquid level like magnetically coupled LPG gauges do. Instead, electrically powered devices are used inside tank, posing a potential safety and regulatory code problem if used in the pressurized LP gas environment inside an LPG tank. The adjusting mechanisms of the disclosed gauges also add to the overall number and complexity of components in each device, therefore further reducing the advantage of adjustability. Finally, the disclosed gauges are not designed for installation in a threaded opening such as is commonly used for LPG tanks.

It is also known to use a magnetically-coupled float-type gauge having an adjustable length support arm to fit a variety of LPG tank sizes. An adjustable LPG gauge, Model No. 49S, is produced by Rochester Gauges, Inc., Assignee of the current application. The gauge utilizes a square-brass centershaft telescoping inside a square-aluminum pinionshaft to hold the coupling magnet. Both of these shafts are housed in an adjustable length support arm comprising telescoping aluminum support tubes. An aluminum locknut compresses an aluminum locking sleeve to secure the tubes at the required support arm length. Even though it has an adjustable length support arm, the Model No. 49S gauge still requires assembly with float arms of different lengths for use in tanks of different heights. Further, the telescoping tubular construction of the Model No. 49S gauge is complex and expensive to assemble and requires metallic components to meet the desired strength and size parameters.

It is also been suggested to use a liquid level gauge having an adjustable length float arm to fit a variety of LPG tank sizes. U.S. Pat. No. 5,072,618, assigned to Rochester Gauges, Inc., Assignee of the current application, discloses a magnetically coupled LPG level gauge having a conventional gauge head and gear assembly mounted on opposite ends of a tubular support shaft. An "L"-shaped float arm is disclosed for attachment to the gear assembly, and it is further disclosed that the length of the float arm can be adjusted to adapt the gauge for use in a range of tank sizes from 30 inches to 41 inches. A hollow plastic float is disclosed which allows the gauge to function in the low density LP gas environment. In practice, however, the performance of gauges produced according to the disclosure of U.S. Pat. No. 5,072,618 has not met expectations. The high performance hollow plastic float costs more to produce than conventional rubber foam floats and the "L"-shaped float arm provides insufficient float arm travel for good measurement accuracy. In addition, the conventional construction of the gauge with a tubular metallic support arm and numerous small components is expensive to manufacture and assemble. Finally, a single gauge of the disclosed design cannot be used for a range of LPG tanks ranging from 24 inches to 42 inches in diameter. Thus, using prior art designs requires that several sizes of gauge must be stocked to accommodate the entire range of commonly encountered tank sizes.

Previously disclosed liquid level gauges utilize components formed primarily of steel, aluminum, and other metallic materials fabricated primarily by machining, stamping, welding, casting and other metal-working processes. This is because the size of the in-tank components of the gauge is always limited by the size of the pressure fitting passage through which it must be installed. For example, while the support arm and float arm of a typical LPG gauge might extend several feet into the tank, the width of the support arm must be less than the width of the fitting passage, typically about 1.13 inches wide. It was previously believed that only metallic components possessed sufficient strength, stiffness and chemical resistance to avoid unacceptable deformations in such applications. The cost of fabricating and assembling metallic components is relatively high, however, compared to other materials such as molded plastics. A need therefore exists, for a liquid level gauge which can have principle components such as the support arm and gear assembly formed of non-metallic materials.

Further, the design of previously disclosed float type gauges required the use of a large number of small discrete secondary components, such as gears, axles, bearings, and fasteners, in addition to the primary components, such as gauge head, support arm, drive shaft, magnet, float arm, and float. These discrete secondary components greatly increase the complexity of previously disclosed float type gauges and the expenses associated with the design, production and stocking of these typically small components increased the cost of the finished gauge. A need therefore exists, for a liquid level gauge which does not require a significant number of discrete secondary components.

Similarly, the complex design of previously disclosed float type gauges necessitates the use of skilled workers for their assembly. For example, the previously disclosed tubular support arms required that the magnet drive shaft be inserted through the end of the support arm and held in position by a discrete bearing or end caps which were themselves installed within or onto the support arm as one or more separate assembly operations. The large number of separate assembly operations and the need for skilled workers to perform these operations increases the cost of the finished gauge. A need therefore exists, for a liquid level gauge which does not require skilled workers for assembly and minimizes the number of separate assembly operations.

SUMMARY OF THE INVENTION

In accordance with one aspect of the current invention, a liquid level gauge support assembly is provided including a gauge head, a support arm, a magnet drive shaft assembly, a pivot arm, and a magnet. The pivot arm is pivotally connected to a lower end of the support arm and the gauge head is connected to the upper end of the support arm. The support arm has a sideways-securing shaft channel formed thereon. The magnet drive shaft assembly is secured in the shaft channel of the support arm so as to engage the pivot arm at the lower end by means of a geared mechanism, and to extend beyond the upper end of the support arm into a passage on the underside of the gauge head. The magnet is attached to the upper end of the drive shaft assembly inside the gauge head. Angular motion of the pivot arm relative to the support arm imparts rotational motion to the drive shaft via the geared mechanism, and thus to the magnet attached to the drive shaft.

In another aspect of the current invention, a gauge sub-assembly is provided comprising a gauge support assembly and a float arm assembly. The float arm assembly includes a float arm and a float. One end of the float arm is connected to the pivot arm of the gauge support assembly and another end is connected to the float. In another embodiment, the float arm assembly further comprises a counterweight arm and a counterweight, one end of the counterweight arm being connected to the pivot arm and the other end being connected to the counterweight.

In yet another aspect of the current invention, a liquid level gauge is provided comprising a gauge subassembly and a magnetically coupled indicator dial. The indicator dial is operably attached to the upper side of the gauge head of the gauge sub-assembly such that the rotation of the magnet can produce a rotation of an indicator mechanism within the indicator dial.

In accordance with yet another aspect of the current invention, a gauge sub-assembly having a fixed-length support arm is provided which can be combined with one of a selected group of float arm assemblies to form a screw-in liquid level gauge which is suitable for use in LPG tanks having a range of sizes from about 24 inches to about 42 inches in diameter, which provides adequate internal clearance during installation and operation, and which provides a high resolution magnetically-coupled indication of the liquid level.

In a still further embodiment, a method is provided for assembling a gauge support assembly having a support arm with a sideways-securing shaft channel.

BRIEF DESCRIPTION OF THE DRAWINGS

A more complete understanding of the invention and its advantages will be apparent from the following detailed description when taken in conjunction with the accompanying drawings in which:

FIG. 1b is a side view of the liquid level gauge of FIG. 1a installed in a vertically oriented tank having a high level of liquid therewithin. A portion of the gauge head is broken away to show the internal components;

FIG. 1c is a top view of the indicator dial of the liquid level gauge when the float is in the position shown in FIG. 1b;

FIG. 2b is the top view of the indicator dial of the liquid level gauge when the float is in the position shown in FIG. 2a;

FIG. 3b is the top view of the indicator dial of the liquid level gauge when the float arm is in the position shown in FIG. 3a;

FIG. 4b is a top view of the indicator dial of the liquid level gauge when the float arm is shown in the position shown in FIG. 4a;

FIG. 5b is a top view of the indicator dial of the liquid level gauge when the float arm is in the position shown in FIG. 5a;

FIGS. 11a and 11b are perspective views of a preferred embodiment of the support arm of the current invention;

FIG. 11c is a partial perspective view, similar to FIG. 11a, of a support arm having an alternative internal head support member;

FIG. 12 is a front view of the support arm of FIGS. 11a and 11b;

FIG. 13 is a side view of the support arm;

FIG. 14 is a cross-sectional view of the support arm taken along line 14—14 of FIG. 12 through the drive shaft retainers and bearings;

FIG. 15 is a cross-sectional view of the support arm taken along line 15—15 of FIG. 12;

FIGS. 16a and 16b are perspective views of a preferred embodiment of the magnet drive shaft of the current invention;

FIG. 17a is a perspective view of a preferred embodiment of a float arm of the current invention;

FIG. 17b is a partial perspective view, similar to FIG. 17a, of the float arm having an alternative attachment member;

FIG. 18 is a perspective view of a preferred embodiment of a float member of the current invention;

FIG. 19 is an alternative one-piece float-and-arm member;

FIG. 24a is a front view of the support arm of the sub-assembly in FIG. 20;

FIG. 24b is a cross-sectional view of the support arm taken along line 24b—24b in FIG. 24a;

FIG. 24c is an enlarged partial side view of the lower portion of the support arm of FIG. 24a with the float arm stub and float arm assembly installed;

FIG. 24d is a partial perspective view of the upper portion of the support arm of FIG. 24a;

FIG. 24e is a partial perspective view, similar to FIG. 24d, of another embodiment of the support arm of the current invention;

FIG. 25 is a front perspective view of the magnet drive shaft sections of the gauge sub-assembly in FIG. 20;

FIG. 26 is an enlarged partial side view of the adjacent ends of the magnet drive shaft sections of FIG. 25 showing them in a connected configuration;

FIG. 27b is a back perspective view of the pivot arm of FIG. 27a;

DETAILED DESCRIPTION

Figure 1A:
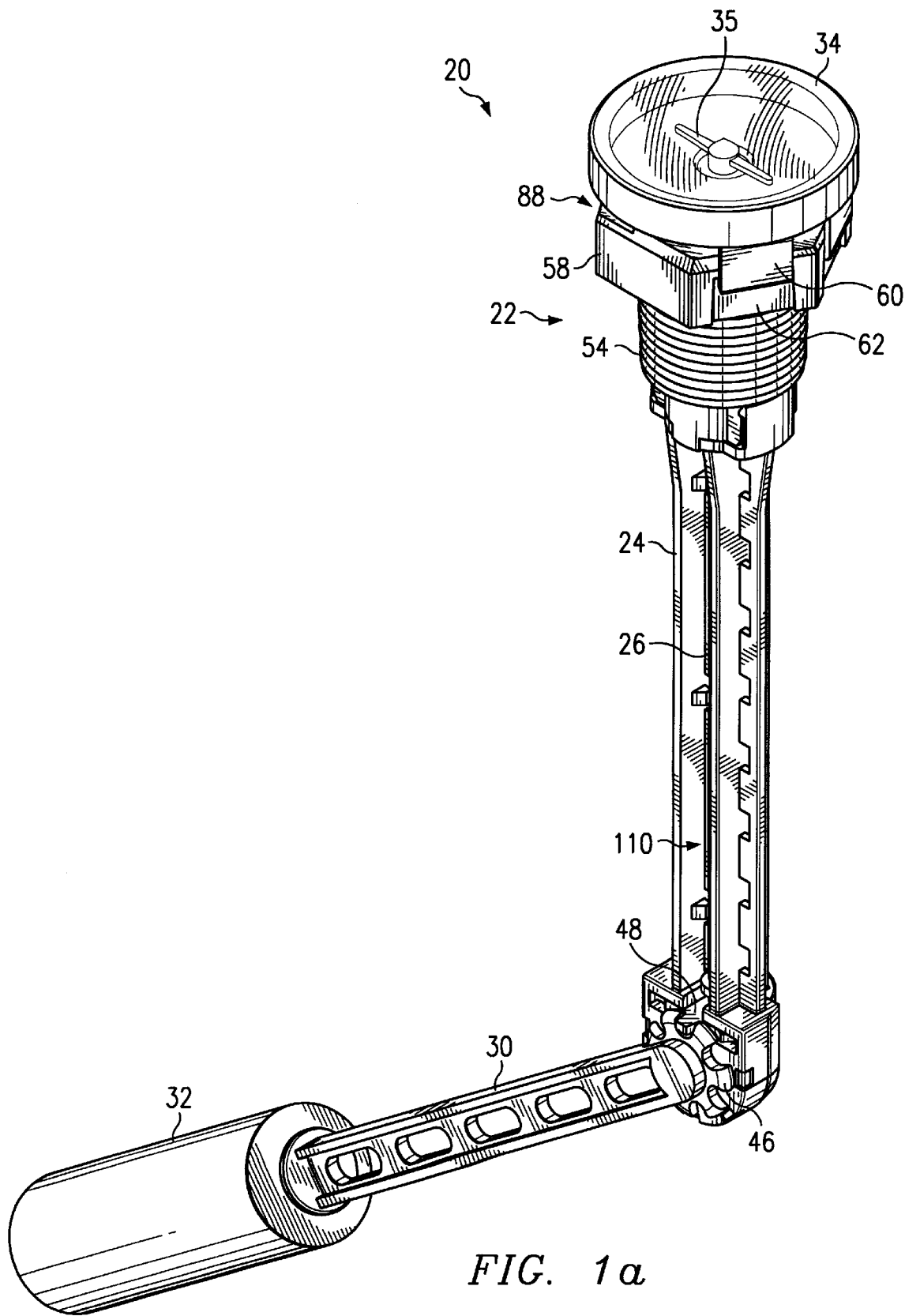
FIG. 1a is a perspective view of a preferred embodiment of the liquid level gauge.

Referring now to the drawings wherein like referenced characters designate like or corresponding parts throughout several views, a preferred embodiment of the liquid level gauge of the present invention is illustrated. Referring first to FIG. 1a, liquid level gauge 20 comprises a gauge head 22 and a support arm 24 attached to and projecting away from the gauge head 22. A magnet drive shaft 26 (best shown in FIG. 1b and FIGS. 16a and 16b) is installed in the support arm 24 so as to allow rotational movement. A magnet 28 (best shown in FIG. 1b and FIG. 16b) is attached to the upper end of the drive shaft 26. A float arm 30 is pivotally attached to the support arm 24, and a float 32 is attached to the float arm 30. A magnetically coupled indicating dial assembly 34 is mounted on the gauge head 22. Indicating dial assembly 34 includes a pointer 35 or other visual indicator of the level being measured.

Referring now to FIG. 1b, liquid level gauge 20 is shown installed in a vertically oriented tank 36 containing a liquid 38 to be measured. When partially submerged in the liquid 38, float 32 is supported by the buoyant force of the liquid. As the level of the liquid 38 within tank 36 changes, the float 32 and the float arm 30 can move through an arc (indicating by reference numeral 40) between the positions shown in FIG. 1b and the alternate position shown by the dashed line designated by reference numeral 42. Gauge 20 incorporates an internal float stop which ensures that the arc of movement is such that a clearance distance (indicated by reference numeral 44) is always maintained between the float 32 and the inside surface of the tank 36 to avoid the possibility that the float 32 might become jammed or wedged against the tank side.

When a change in the level of liquid 38 causes the float 32 and the float arm 30 to move along arc 40, a float arm gear 46 which moves with the float arm 30 imparts rotary motion to a shaft gear 48, which moves with drive shaft 26. In this preferred embodiment, the float arm gear 46 is formed integrally with the float arm 30 and the shaft gear 48 is formed integrally with the drive shaft 26, however either or both of these parts may be formed separately and connected to its respective partner by means known in the art.

Referring still to FIG. 1b, rotation of the drive shaft 26 causes corresponding motion of the magnet 28 which is fixed to the upper end of draft shaft 26 by a magnet holder 50. In this preferred embodiment, the magnet holder 50 is formed integrally with the drive shaft 26, although the holder 50 could be formed separately and attached to drive shaft 26 using known means. Also in this preferred embodiment, magnet holder 50 is adapted to hold magnets having a cylindrical configuration, since magnets of this type can be economically produced through batch magnetization. The upper end of the drive shaft 26 having the magnet holder 50 and the magnet 28 extends into a tubular passage 52 formed in the gauge head 22. The gauge head 22 has a unitary non-magnetic body which is externally threaded along its lower end portion 54 for attachment to tank fitting 56. Indicating dial assembly 34 is installed on the upper portion 58 of gauge head 22. In the preferred embodiment, dial assembly 34 is secured to gauge head 22 using snap-on feet 60 which interfit with recesses 62 formed in the gauge head 22, however other embodiments (not shown) can use alternative fastening means known in the art, such as screws, without departing from the scope of the invention. The indicating dial assembly 34 has a receiving magnet 64 positioned on its underside and connected to the pointer 35 as is known in the art. When the magnet 28 is turned by the drive shaft 26, its magnetic field obviously is similarly turned, causing a corresponding movement of the receiving magnet 64 and the pointer 35 to indicate the level of liquid in the tank.

Figure 2A:
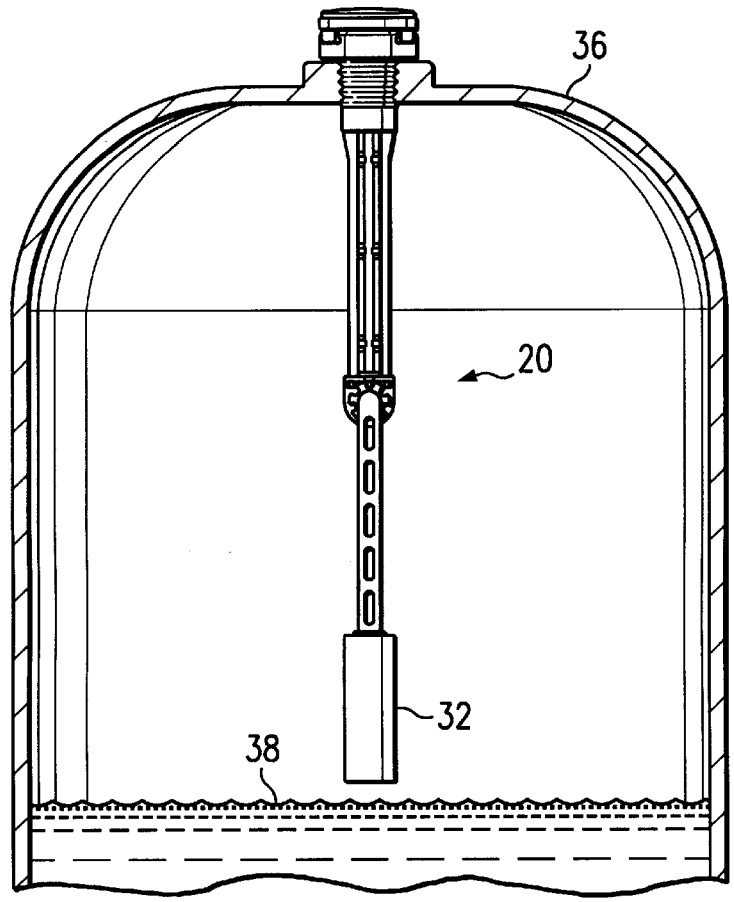
FIG. 2a is a side view of the liquid level gauge installed in a vertically oriented tank, similar to FIG. 1b, wherein the tank has a low level of liquid therewithin.
Figure 2B:
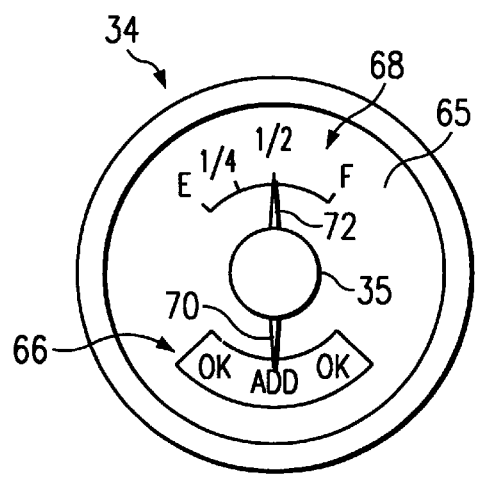

In the preferred embodiment, indicating dial assembly 34 is adapted for use in both vertically oriented and horizontally oriented tanks by means of dual indicating ranges. Referring now to FIG. 1c, the indicating dial assembly 34 for the gauge in FIG. 1b is shown with the pointer 35 oriented in the position corresponding to the liquid level and float arm position shown in FIG. 1b. The indicator dial assembly 34 has an indica plate 65 marked with a vertical indicator range 66 provided for use when the tank is in a vertically oriented position and a horizontal indicating range 68 provided for use when the tank is in a horizontally oriented position. Pointer 35 has a vertical pointer arm 70 and a horizontal pointer arm 72 indicating the measured level on their respective ranges. For example, since tank 36 shown in FIG. 1b is vertically oriented, then the vertical indicating range 66 and the vertical pointer arm 70 may be used to ascertain the satisfactory level of liquid in the tank (denoted by the indicator "OK"). Referring now to FIGS. 2a and 2b, gauge 20 is shown installed in a vertically oriented tank in which the level of liquid 38 is below the position of the float 32. Using the vertical indicating range 66 and vertical pointing arm 70, as shown in FIG. 2b, it can be ascertained that additional liquid can be added to the tank (denoted by indication the "ADD").

Figure 3A:
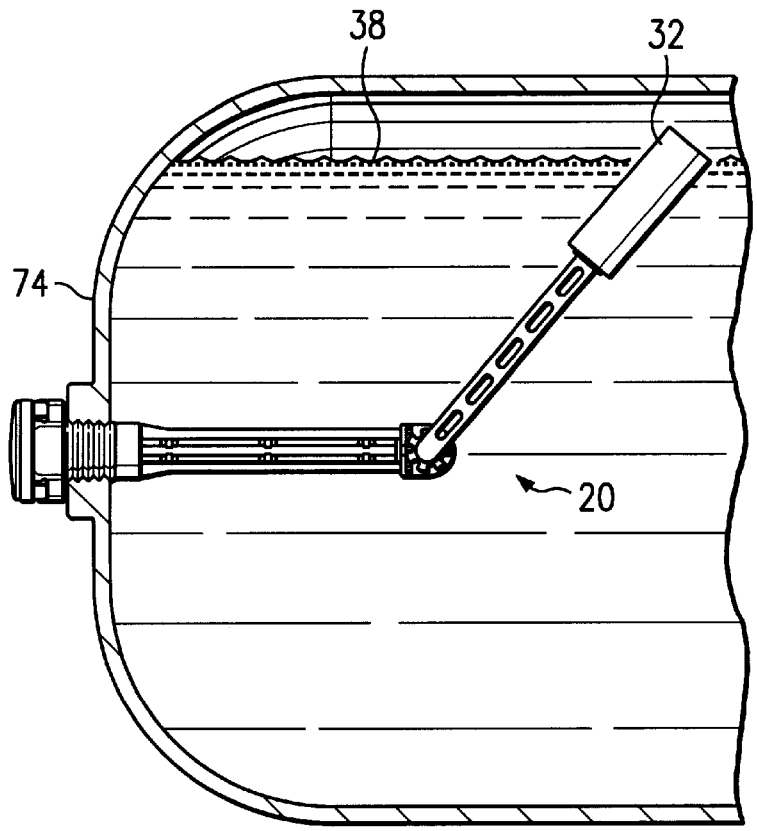
FIG. 3a is the side view of the liquid level gauge installed in a horizontally oriented tank, wherein the tank has a high level of liquid therewithin.
Figure 3B:
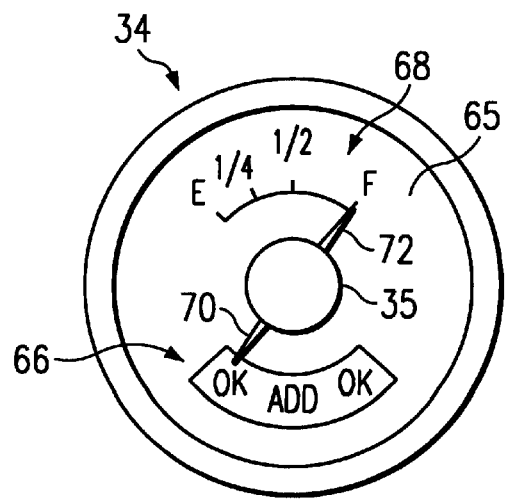
Figure 4A:
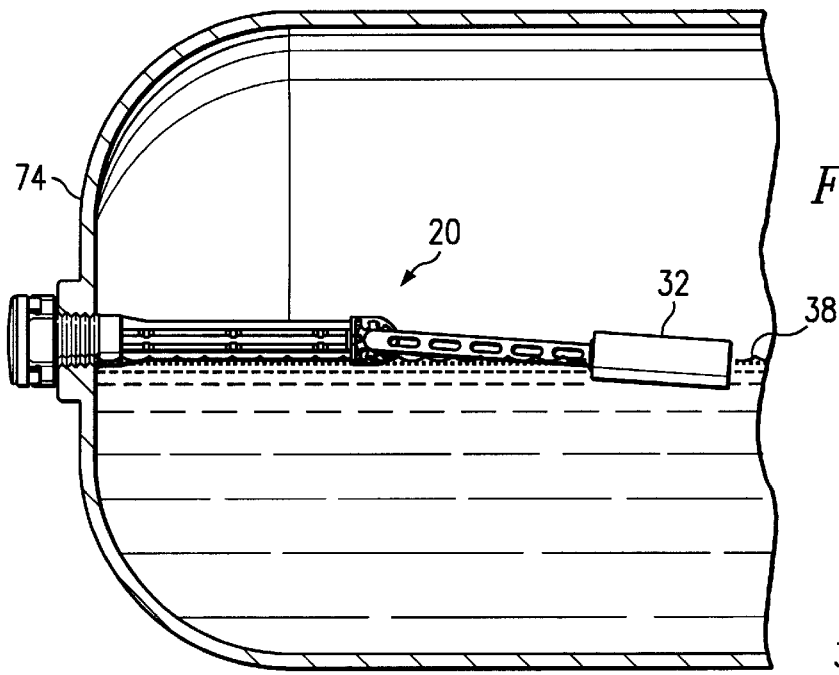
FIG. 4a is a side view of the liquid level gauge installed in a horizontally oriented cylinder, similar to FIG. 3a, wherein the tank is approximately one-half filled with liquid.
Figure 4B:
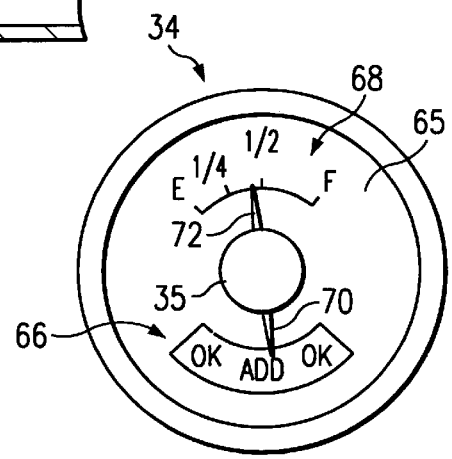
Figure 5A:
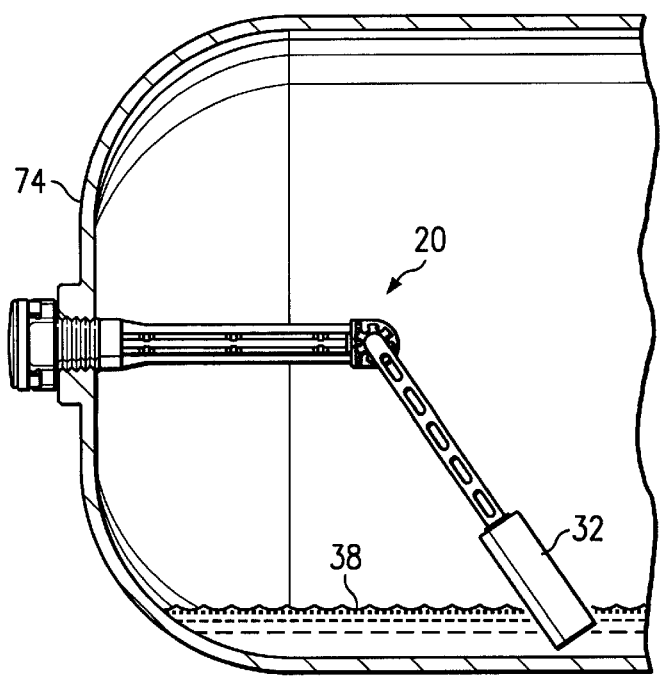
FIG. 5a is a side view of the liquid level gauge installed in a horizontally oriented tank wherein the tank has a low level of liquid therewithin.
Figure 5B:
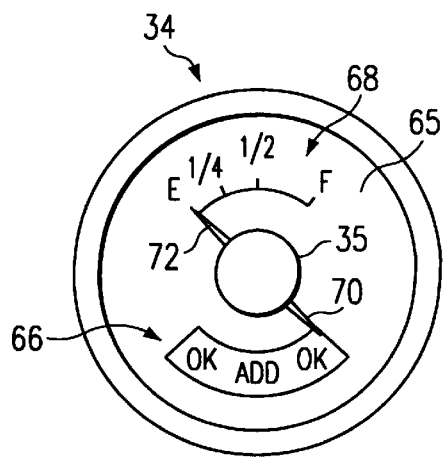

Referring now to FIGS. 3a, 4a, and 5a, a liquid level gauge 20 is shown installed in a horizontally oriented tank 74 having, respectively, full, one-half full, and empty level of liquid 38 therein. FIGS. 3b, 4b, and 5b, respectively, show indicating dial assembly 34 with pointer 35 being oriented to correspond with the positions of the float arm 30 shown in FIGS. 3a, 4a, and 5a. Since the tank is now oriented horizontally, the horizontal indicating range 68 and horizontal pointing arm 72 are used to determine the appropriate liquid level in each tank (denoted by "F", "½", "E", respectively). It will be readily apparent that other indicia could be utilized on the indicator dial to display the level of liquid in the tank without departing from the scope of the current invention.

In the liquid level gauge of the current invention, a number of specially adapted components are combined in a new and unique way to provide a liquid level gauge with low parts count, ease of manufacture, and ease of assembly. For example, referring to FIGS. 8 through 10, a preferred embodiment of a gauge head 22 for the current invention is shown. The gauge head 22 mounts the gauge in an opening formed in the tank whose liquid level is to be measured while preventing the escape of volatile liquids or vapors from within the tank. In the embodiment shown, the gauge head 22 has a one piece non-magnetic body which is externally threaded along its lower end portion 54 for attachment to a tank fitting 56 (FIG. 1b). In the preferred embodiment, the gauge head 22 is made of zinc; however, other non-magnetic materials, such as brass, aluminum, or plastic could be used, depending upon the expected pressures within the tank and the type of liquid material being measured. In addition, while the preferred embodiment uses screw threads for attachment to the tank fitting, it will be readily apparent that bolted flanges or other pressure-tight attachment methods known in the art could be used without departing from the scope of the current invention.

Figure 6:
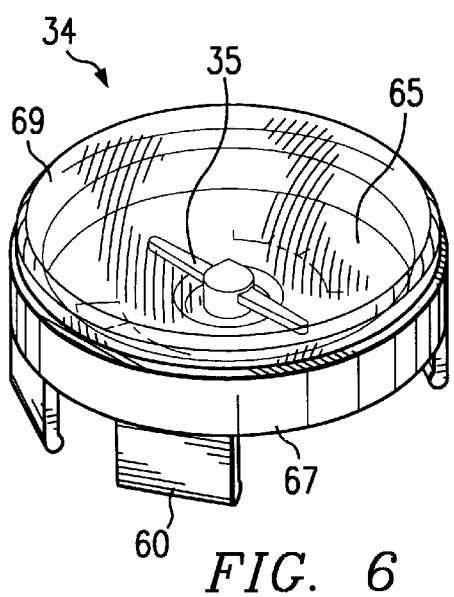
FIG. 6 is a perspective view of a preferred embodiment of the indicating dial assembly of the current invention.
Figure 7:
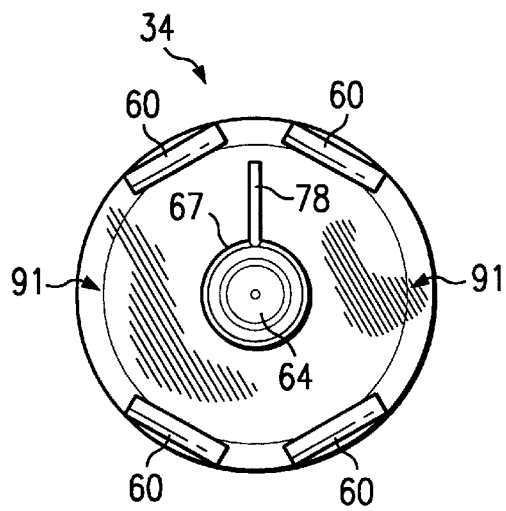
FIG. 7 is a bottom view of the indicating dial assembly of FIG. 6.

To facilitate ease of assembly, the gauge head 22 of the preferred embodiment is designed to accept a snap-on indicator dial assembly 34 such as that shown in FIGS. 6 and 7. Dial assembly 34 has a pointer 35 and indicia plate 65 as previously described, both of which are typically sealed inside a non-metallic case or shell 67 and visible through a clear lens 69. Downward projecting feet 60 on the indicator dial assembly 34 snap into recesses 62 (FIG. 8) formed in the upper portion of the gauge head, retaining the indicator dial 34 in the proper position. An index slot 76 (FIG. 8) formed on the upper surface of the gauge head 22 cooperates with an index key 78 (FIG. 7) formed on the lower surface of the indicator dial 34 to ensure that the indicator dial is properly oriented on the gauge head. The receiving magnet 64 (FIG. 7) is rotatably mounted inside shell 67 and positioned on the underside of the indicator dial assembly 34 so as to protrude into a recess 80 (FIG. 8) formed in the upper surface of the gauge head when dial assembly 34 is mounted on gauge head 22. The receiving magnet 64 is connected to the pointer 35 (FIG. 6) as is known in the art so that both rotate together within case 67. As best seen in FIG. 10, the gauge head 22 has a wall 82 separating the upper recess 80 from the tubular passage 52. When assembled, the receiving magnet 64 of the indicating dial 34 is proximate to upper surface 84 of the wall 82 while the magnet 28 (FIG. 1b) is proximate to lower surface 86 of the wall. Since the wall 82 is non-magnetic, the magnetic field of magnet 28 extends through the wall. The receiving magnet 64 aligns its magnetic field with that of magnet 28 and thereby can indicate, by means of attached pointer 35, the movement of magnet 28 without requiring a physical connection through wall 82. In this manner, the gauge head provides a liquid-and vapor-tight seal for the tank. In the preferred embodiment, the gauge head 22 incorporates at least one pry slot 88 formed in the upper portion of the gauge head to facilitate removal of the indicator dial assembly 34 by the use of a slot head screwdriver or similar tool. The preferred embodiment of gauge head 22 also includes a pair of wrench flats 89 formed on opposite sides of the upper portion 58 which allow the use of a large wrench or similar tool to install, tighten, or remove the gauge from the tank without necessitating removal of the indicator dial 34. Referring again to FIG. 7, it will be noted that the preferred embodiment of indicator gauge 34 has the snap-on legs 60 arranged so as to provide unobstructed areas, indicated by reference numerals 91, corresponding to the locations of the wrench flats 89 when the dial is installed on the gauge head. Referring once again to FIGS. 8 through 10, gauge head 22 has additional features facilitating the easy assembly of the current invention, including support arm mounting tabs 90 and a support arm index slot 92 formed on the lower end of the gauge head.

Referring now to FIGS. 11a through FIG. 15, the detailed structure of the support arm 24 is shown. In the preferred embodiment shown, the support arm 24 is a one-piece assembly produced from injection molded acetal plastic. While acetal plastic is preferred for its chemical resistance, strength, and economy, other plastics, such as polyester, or other materials can be used. In addition, while a one-piece assembly is preferred, it will be apparent that multiple-piece assemblies can be used without departing from the scope of the current invention. The support arm 24 comprises an upper portion 94 for attachment to the gauge head 22, a lower portion 96 for attachment to the float arm 30, and a middle portion 98 for supporting the magnet drive shaft 26. The support arm 24 is connected to the gauge head 22 by means of at least one latching member 100. To facilitate easy attachment of the support arm 24 to the gauge head 22, in the preferred embodiment, latching member 100 is adapted to snap fit over the mounting tab 90 (FIG. 8) of the gauge head, although other attachment means known in the art could be used. To facilitate the alignment of the support arm and the gauge head, and to provide additional structural strength to the joint therebetween, a preferred embodiment of the support arm 24 also includes an internal support member 102 which is adapted to fit within tubular passage 52 (FIG. 10) of the gauge head 22. To provide maximum support, the internal support member 102 may take the form of a nearly complete cylinder as shown in FIG. 11a. As shown in FIG. 11c, however, the internal support member can also be formed from two or more partially cylindrical members 104a and 104b, which provide the desired internal support but which do not interfere with other desirable properties, such as the injection moldability of the support arm 24. If the internal support member 104a and 104b shown in FIG. 11c are utilized on a support arm 24 rather than the single piece internal support arm 102, then the entire support arm 24 can be formed by injection molding in a die having a single separation axis (i.e., the direction of die separation) as indicated by the dashed lines denoted by reference numerals 106 in FIG. 11c. To further ensure proper alignment of the support arm 24 on the gauge head 22, an alignment key 108 can be provided which interfits into the index slot 92 (FIGS. 9 and 10) in the lower portion of the gauge head.

Another feature of the support arm 24 which facilitates ease of assembly and low parts count of the current invention, is the side-accessible shaft passage 110 formed by the middle portion 98 of the support arm. The term side-accessible refers to the structure of the support arm 24 having a continuous unobstructed opening along a lateral side (that is, a side generally parallel to the longitudinal axis of the shaft passage 110) between the shaft passage 110 and the exterior allowing the drive shaft 26 to be inserted into the shaft passage 110 in a direction generally perpendicular to the longitudinal axis of both the drive shaft and the shaft passage. Prior art float gauges have heretofore used tubular support arms which required the drive shaft to be installed through the end of the support arm in a direction generally aligned with the longitudinal axes of the drive shaft and shaft passage, thus limiting the size of components which can be attached to the shaft prior to the installation and requiring separate bearings to support the shaft. The side-accessible shaft passage 110 of the current invention is a great improvement because it allows magnet drive shafts to be installed into the support arm 24 even if the drive shaft has magnet holders, gears, or other structures on the ends which are wider than the shaft passage. This is especially desirable for use with drive shafts having integral magnet holders and gears. In addition, the side-accessible shaft passage 110 allows the shaft bearings 122, 124 (FIGS. 12, 14) to be an integral part of support arm 24 rather than requiring them to be separate parts.

As best seen in FIGS. 14 and 15, in the preferred embodiment, the side-accessible shaft passage 110 is formed by the U-shaped combination of sidewalls 112 and back wall 114 that form the middle portion 98 of the support arm. In addition, a corresponding slot 115 is provided in head stop 116 and in internal support member 102 to allow the lateral insertion of the magnet drive shaft 26 (shown in place in FIG. 1b). In the preferred embodiment, the middle portion 98 of the support arm further comprises longitudinal support members 118 adding to the rigidity of the support arm. In the embodiment shown, the support members 118 form holes 120 to reduce material usage without significantly affecting the rigidity provided by support members 118. It will be readily apparent that other configurations for the middle portion of the support arm, including a C-shaped, V-shaped, I-shaped, or H-shaped cross-section, can be used to provide the side-accessible drive shaft passage without departing from the scope of the current invention.

To facilitate the easy assembly of the magnet drive shaft into the support arm 24, and to reduce the need for additional discrete parts, a preferred embodiment of the support arm 24 has integral shaft retainers 122 and shaft bearings 124 (best seen in FIGS. 12 and 14) formed on the side walls 112 and back wall 114. When the magnet drive shaft (not shown) is inserted into the side-accessible shaft passage 110, the side walls 112 flex in the directions shown by the arrows denoted by reference numeral 128, allowing the drive shaft to pass between the shaft retainers 122 and into the position shown in phantom and denoted by reference numeral 126, i.e., positioned between the shaft retainers 122 and the shaft bearing 124. Once in the position denoted by reference numeral 126, the drive shaft is securely retained in the support arm 24 yet free to rotate or to move longitudinally (if not otherwise restrained by other components).

Referring still to FIGS. 11a through 15, the lower end 96 of the support arm 24 is adapted for pivotal connection to the float arm 30 (FIG. 17a). In a preferred embodiment, the lower end 96 forms a passage 130 for receiving a pivot pin 132 (FIGS. 17a and 17b) of the float arm 30; however, it is apparent that the relative locations of the pin 132 and passage 130 on the support arm 24 and float arm 30 can be reversed. To prevent the float 32 from touching the sides of the cylinder, an internal float stop is provided on the float arm 30 and the support arm 24 to limit the range of motion of the float arm. The float stop is considered internal where its components are not exposed on the outside surface of the gauge. This minimizes the possibility that the float stop mechanism will be contaminated by any debris within the cylinder. In a preferred embodiment, the internal float stop comprises a keyway 134 (FIG. 12) that is formed on support arm 24 in an arc surrounding passage 130 to interfit with a key 136 (FIGS. 17a and 17b) formed on the float arm 30. The key 136 and keyway 134 cooperate to restrict the range of motion of the float arm 30 to the arc denoted by reference numeral 138 in FIG. 12. Float gear 46 completely covers the float stop components 134, 136 in the assembled gauge, thus making the float stop internal. In this preferred embodiment, the lower end 96 also forms a shaft gear passage 140 to accommodate the shaft gear 48 (FIGS. 16a and 16b) when the magnet drive shaft 26 is installed in the shaft passage.

Referring now to FIGS. 16a and 16b, the magnet drive shaft 26 has an upper end 142 having a magnet holder 50 and a lower end 144 having a shaft gear 48. In the preferred embodiment, the drive shaft 26 is a one-piece assembly produced from injection-molded acetal plastic, but like other components previously described, it will be apparent that other materials or multiple-piece assemblies can also be used. The magnet holder 50 is adapted for the snap-fit attachment of a cylindrical magnet 28 as shown in FIG. 16b. The cylindrical magnet has its magnetic poles at the flat ends of the cylinder. Cylindrical magnets of this type are inexpensive to produce because they can be manufactured through batch magnetization. In addition, the magnetic flux field of the cylindrical magnet 28 is automatically aligned with respect to the magnet holder 50, thus further simplifying assembly of the gauge. In the preferred embodiment, which has an indicator dial assembly 34 having a pointer 35 with double arms 70, 72, the orientation of the North and South poles of magnet 28 within magnet holder 50 is completely irrelevant to proper operation of the gauge. While use of a cylindrical magnet is preferred, however, it will be readily apparent that bar, disk, horseshoe, or other such magnets could be used if they are properly aligned on the magnet drive shaft.

When manufactured of a resilient material, the magnet holder 50 of the preferred embodiment will flex to allow the snap-fit attachment of the magnet. In addition, this magnet holder can be molded as an integral piece of the magnet drive shaft, thereby insuring alignment of the magnet 28 with respect to the drive shaft gear 48, lowering the number of discrete components forming the level gauge and simplifying assembly. The magnet holder 50 shown in the preferred embodiment can be injection molded in a die having a single separation axis.

As best seen in FIG. 1b, in the assembled liquid level gauge, the upper end 142 of drive shaft 26 extends beyond the upper end of the support arm 24 and into the tubular passage 52 of the gauge head 22, thereby engaging the magnetic field of the receiver magnet 64 with the magnet field of magnet 28 to indicate the position of the float arm. The drive shaft gear 48 is formed at the lower end 144 of the drive shaft 26 and adapted to fit through shaft gear passage 140 (FIG. 12) at the bottom end of the support arm 24. A plurality of gear teeth 146 are formed on shaft gear 48 for engaging the float arm gear 46 (FIG. 17a and 17b). A flange 147 (FIG. 16a) can be formed on the drive shaft 26 which interfits with a groove feature 141 (FIG. 12) of the shaft passage 110 to prevent longitudinal motion of the shaft. A positioning notch 148 or other such indicia can be provided on one of the gear teeth 146 to provide an indication of the orientation of the magnet holder 50 at the other end, thereby facilitating proper orientation of the components during assembly.

Referring now to FIG. 17a, a preferred embodiment of the float arm 30 is shown. In this embodiment, the float arm is a single-piece assembly produced from injection-molded acetal plastic, however, other materials and a multiple-piece assembly could also be used. The float arm 30 is pivotally connected to the support arm 24 by the pivot pin 132 which passes through the passage 130 (FIGS. 11a through 13). In the preferred embodiment shown in FIG. 17a, pivot pin 132 is retained in the passage 130 by a flanged fastener 150 which is pressed into a passage 152 formed in the end of pivot pin 132. In an alternative embodiment, as shown in FIG. 17b, pivot pin 132 is retained in passage 130 by an integral snap fastener L54 molded on the end of pivot pin 132. The use of an integral snap fastener will decrease the parts count and improve the ease of assembly. As previously described, a float arm gear 46 is provided at the upper end 149 of the float arm 30 to engage the drive shaft gear 48 (FIG. 16a and 16b). In the preferred embodiment, float arm gear 46 is an integral part of the float arm 30, thereby reducing the number of parts of the gauge and simplifying assembly. It will be readily apparent, however, that the float arm gear 46 could be provided as a separate component. At the lower end 156 of the float arm, an attachment member 158 is provided for attachment of the float 32. In the preferred embodiment shown in FIG. 17a, the attachment member 158 comprises an array of barbs which can be pushed into a matching hole 160 (FIG. 18) formed in float 32; however, other attachment means known in the art could be used. Due to the low density of LPG liquids and the relatively low buoyant forces that they produce, it is preferred that the middle portion 162 of the float arm 30 have the lightest possible structure. In the preferred embodiment, the middle portion 162 is formed from a molded plastic material having an I-beam cross-section for rigidity and having lightening holes 164 formed in the center web 166. The preferred embodiment of the float arm 30 shown in FIG. 17a can be conveniently produced as single piece injection molding utilizing a die having a single separation axis in the direction indicated by the dashed arrows denoted by reference number 168.

Referring now to FIG. 18, the float 32 provides buoyancy to the float arm through the displacement of the liquid being measured. The float should be as light as possible yet able to withstand the pressure within the tank. Hollow metal or non-metallic floats such as those used in previous liquid level gauges may be used; however, hollow floats are expensive to fabricate and prone to leakage. It is therefore preferred to use a solid float 32 comprising a core 170 formed of pressure-resistant closed cell foam enclosed in a wear resistant outer covering or shell 172. In the preferred embodiment, the float 32 is formed of nitrile ebonite, a form of nitrile rubber. This material is especially well suited for such floats because it forms an integral shell 172 where the foam material of the core 170 touches the walls of the molding cavity. Thus, both the core 170 and the shell 172 of the float 32 can be formed of nitrile ebonite in a single operation. A float 32 of this type can be easily attached to the float arm 30 by pushing the attachment member 158 (FIG. 17a) into the mounting hole 160 provided in the float.

Referring now to FIG. 19, in an alternative embodiment, the separate float arm 30 and float 32 can be replaced with a one-piece float-and-arm member 174 having an integral arm portion 176 and an integral float portion 178. The arm portion 176 may further have a float arm gear 46 formed thereon as another integral piece. Depending upon the material used to form the float-and-arm member 174, the float portion 178 may have less buoyancy than a separately molded float, such as float 32 made with closed cell foam. Therefore, float-and-arm member 174 can have an integral counterweight member 182 formed on the opposite side of pivot point 180 from arm portion 176 and float portion 178. To facilitate easy insertion of the float gauge into the tank, the counterweight 182 can be rod shaped so that the counterweight can lay parallel to the support arm 24 during insertion into the tank. If additional counterweight is required, a mass 184 (shown in phantom) can be formed on the counterweight 182 while still allowing easy insertion of the float-and-arm member 174 into the tank. In a preferred embodiment, the float-and-arm member 174, including any counterweights, will be constructed as a one-piece assembly, such as by injection molding of plastic or other materials.

A liquid level gauge according to the current invention provides a gauge having a very low parts count, and which can be assembled without the use of specialized tools or equipment. For example, if the magnetically coupled indicator dial assembly is considered a single component, the preferred embodiment of the liquid level gauge 20 can be constructed of only eight discrete components as follows: a magnet (FIG. 16b); a one-piece magnet drive shaft (FIGS. 16a and 16b); a one-piece support arm (FIGS. 11a through 15); a one-piece gauge head (FIGS. 8 through 10); a one-piece float-arm (FIG. 17a); a fastener (FIG. 17a); a float (FIG. 18), and a magnetically coupled indicator dial assembly (FIGS. 6 and 7). Assembling the gauge 22 requires only the following steps: Place magnet 28 into magnet holder 50 of drive shaft 26; push drive shaft 26 laterally into side-accessible passage 110 of support arm 24 with integral shaft gear 48 positioned in opening 140; insert upper end 142 of drive shaft 26 into passage 52 of gauge head 22 while pushing upper end 94 of support arm 24 onto gauge head 22; insert pivot pin 132 of float arm 30 through passage 130 of support arm 24 while engaging float gear 48 with shaft gear 46; insert flanged fastener 150 into passage 152 in pivot pin 132; push float 32 onto attachment member 158 of float arm 30; and snap feet 60 of indicator dial assembly 34 into recesses 62 of gauge head 22. It will be readily appreciated that the order of these steps may be re-arranged without departing from the scope of the current invention.

In an alternative embodiment, a liquid level gauge according to the current invention can be constructed from only six discrete components as follows: a magnet (FIG. 16b); a one-piece drive shaft (FIGS. 16a and 16b); a one-piece support arm (FIGS. 11a through 15); a one-piece gauge head (FIGS. 8 through 10); a one-piece float-and-arm member (FIG. 19) having an integral snap fastener (FIG. 17b), and a magnetically coupled indicator dial assembly (FIGS. 6 and 7). Assembling this gauge 22 requires only the following steps: Place magnet 28 into magnet holder 50 of drive shaft 26; push drive shaft 26 laterally into side-accessible passage 110 of support arm 24 with integral shaft gear 48 positioned in opening 140; insert upper end 142 of drive shaft 26 into passage 52 of gauge head 22 while pushing upper end 94 of support arm 24 onto gauge head 22; insert pivot pin 132 of float-and-arm member 174 through passage 130 of support arm 24 while engaging float gear 48 with shaft gear 46 until integral snap-fastener 154 locks into place; and snap feet 60 of indicator dial assembly 34 into recesses 62 of gauge head 22. As with the previously described embodiment, the order of these steps may be re-arranged.

Many of the components of the current invention, such as the one-piece magnet drive shaft 26, the one-piece support arm 24, and one-piece float arm 30 can be constructed from injection molded plastics or similar materials. The one-piece gauge head 22 can be made of die cast or machined metal or of injection molded plastic depending on the material required. The unique design of the current invention allows such one-piece components, which can be efficiently manufactured using automated methods, to replace numerous discrete components which were produced by machining, stamping and other complex fabrication methods. In addition, the components of the current invention can be assembled without specialized equipment. This results in a great cost savings to the gauge manufacturer while providing the gauge user with a simple, reliable, and attractive liquid level gauge.

In another aspect of the current invention, a liquid level gauge sub-assembly is provided for use with a user- supplied magnetically coupled sensor. In this embodiment, the gauge sub-assembly would comprise a gauge head 22, support arm 24, shaft 26, magnet 28, float arm 30 and float 32. An indicator dial assembly is not provided, instead gauge head 22 is adapted for connection to a user- supplied magnetically coupled sensor. Such sensors are well-known in the art and may provide either a visual indication of level, or an electrical resistance or voltage relating to the liquid level, or both. In all other respects, operation of this liquid level gauge sub-assembly and the components of which it is comprised, are identical to the embodiments of the liquid level gauge previously described.

Referring now to FIGS. 20–28b, a liquid level gauge according to another embodiment of the current invention is described. Some aspects of this embodiment are substantially identical to those of the embodiments previously described, however, the dimensions and selected aspects have been changed as described below. Gauges according to this embodiment and others described herein are suitable for use in cylindrical tanks for the storage of LPG and other pressurized liquids having a diameter within the range from about 24 inches to about 42 inches. In particular, selected embodiments can be used in cylindrical LPG tanks having an outside diameter of 24 inches, 30 inches, 31.5 inches, 37 inches, 40.5 inches and 41 inches.

Figure 20:
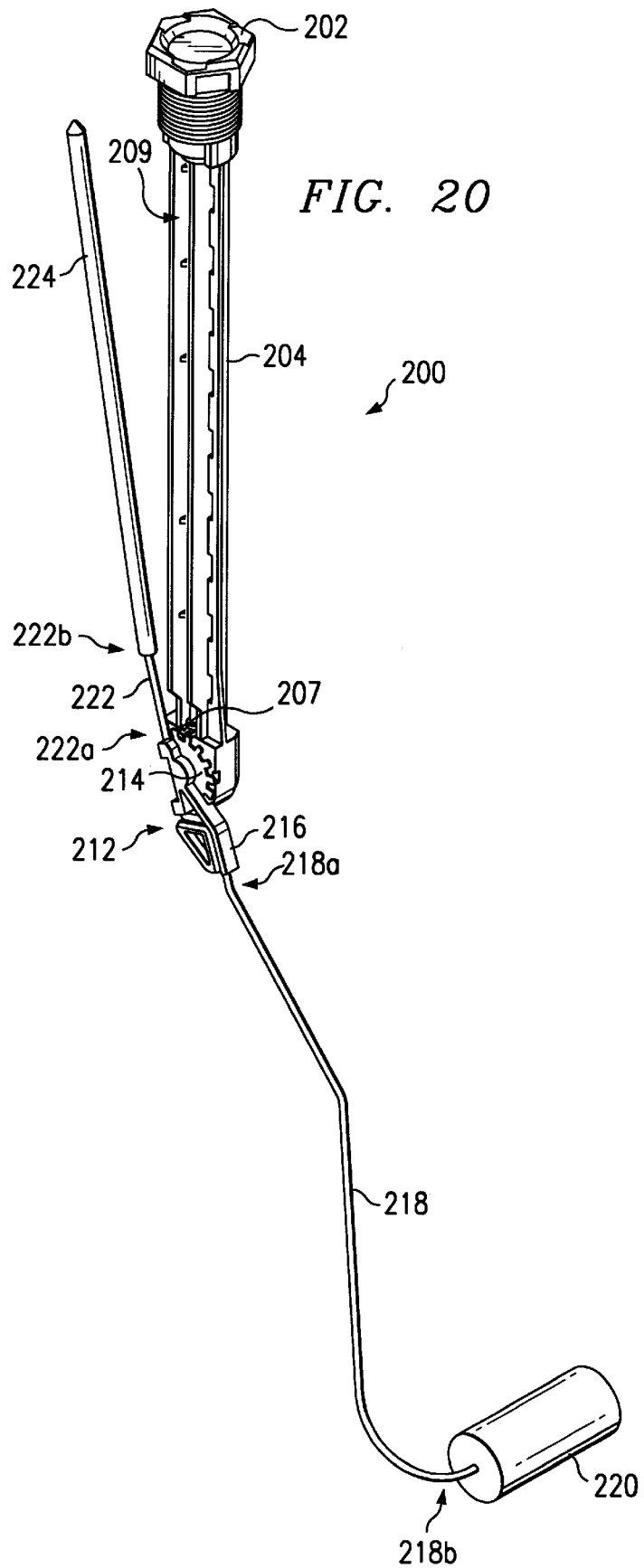
FIG. 20 is a perspective view of a gauge subassembly according to another embodiment of the current invention.

Referring first to FIG. 20, a liquid level gauge sub-assembly 200 including the in-tank components of a gauge is shown. The sub-assembly 200 comprises a gauge head 202 and a fixed-length support arm 204 attached to and projecting away from the gauge head 202. A fixed-length magnet drive shaft assembly (best seen in FIGS. 25 and 26) is installed in a sideways-securing drive shaft passage or channel 209 formed in the support arm 204 so as to prevent lateral and longitudinal movement but to allow rotational movement of the installed assembly. The drive shaft assembly includes a magnet holder 205 at its upper end and a pinion gear portion 207 at its lower end. A magnet 210 (FIG. 25) is mounted in the magnet holder 205 at the upper end of the drive shaft assembly such that it is positioned within a passage 52 (see FIG. 1b and, e.g., FIG. 22f) formed in the gauge head 202. A pivot arm 212 including a spur gear portion 214 and an arm attachment portion 216 is pivotally attached to the lower portion of support arm 204 such that the teeth of the spur gear portion 214 operably engage the teeth of the pinion gear 207. Thus, an angular motion of the pivot arm 212 causes a corresponding rotational motion of the drive shaft assembly and associated magnet 210. A float arm 218 can be attached at a first end 218a to the arm attachment portion 216 of the pivot arm 212 and a float 220 can be affixed to the second end 218b of the float arm 218. A counterweight arm 222 can be attached at a first end 222a to the arm attachment portion 216 of the float arm 212 and a counterweight 224 can be mounted at the second end 222b of counterweight arm 222. In this application, the components that pivot with the pivot arm 212, including the float arm 218, the float 220, the counterweight arm 222, and the counterweight 224, are collectively referred to as the float arm assembly and collectively denoted by reference numeral 225. In a preferred embodiment of the invention, the float arm 218 is formed integrally with the counterweight arm 222.

To form a complete liquid level gauge (FIG. 21), a magnetically coupled indicator dial assembly 226 can be operably attached to the gauge sub-assembly 200. The magnetically coupled indicating dial assembly 226 (FIGS. 21 and 23) has a configuration similar to dial assembly 34 (FIGS. 6 and 7) previously described. Indicating dial assembly 226 can include a pointer 272 or other visual indicator of the liquid level being measured. Alternately, dial assembly 226 can include a magnetically coupled device such as a variable resistor or a voltage divider (not shown) as is known in the art for producing a signal suitable for remotely reporting the angular position of the magnet 205 (and hence, for reporting the level being measured). In still other embodiments, dial 226 can produce both visual and remote indications of the level being measured.

Figure 21:
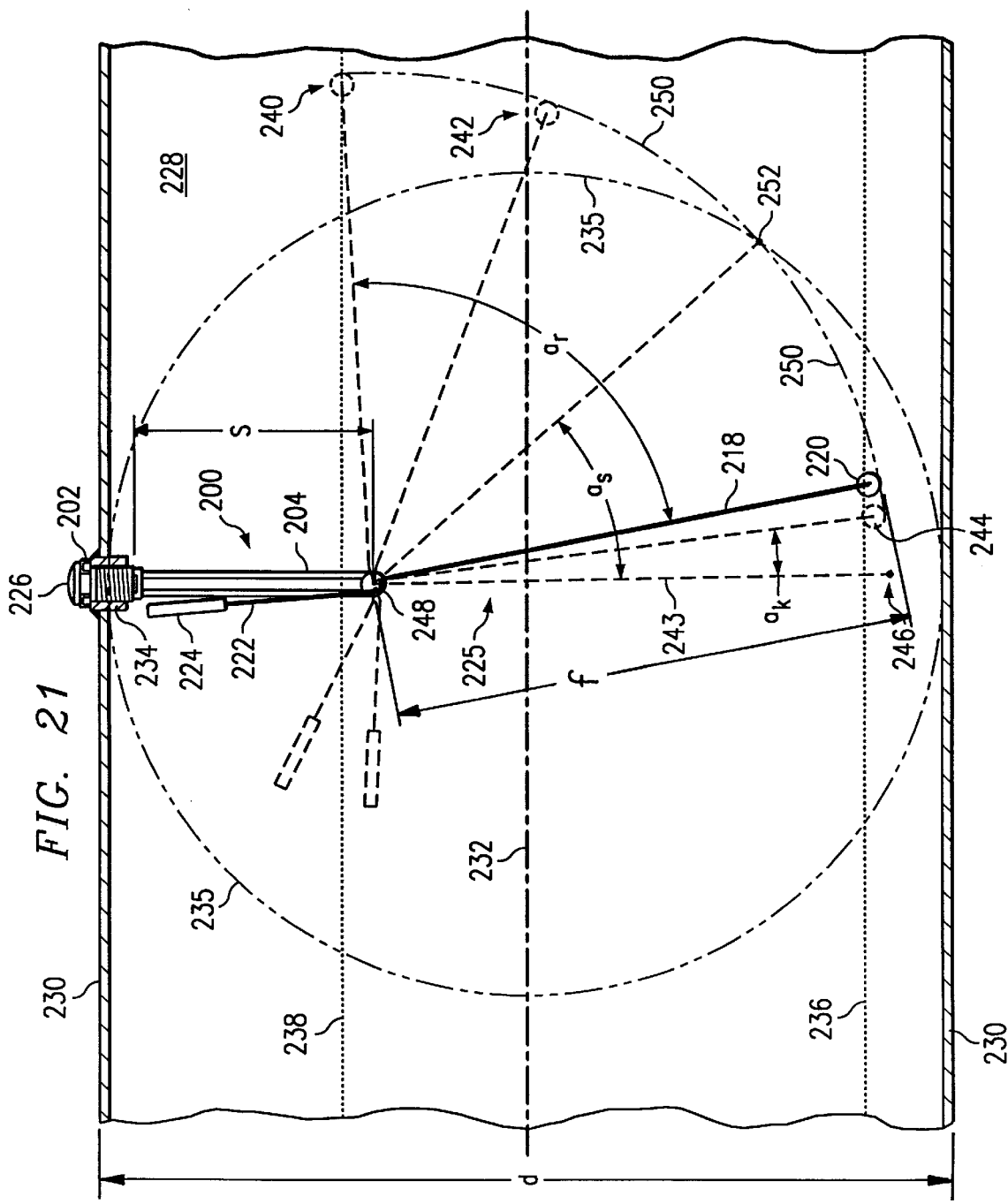
FIG. 21 is a partial side cut-away view of a liquid level gauge including the sub-assembly of FIG. 20 installed in a horizontally oriented cylindrical tank.
Figure 22A:
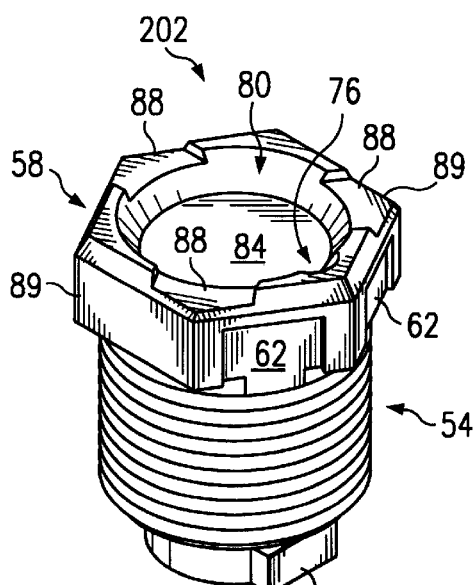
FIG. 22a is a front perspective view of the gauge head of the sub-assembly in FIG. 20.
Figure 22B:
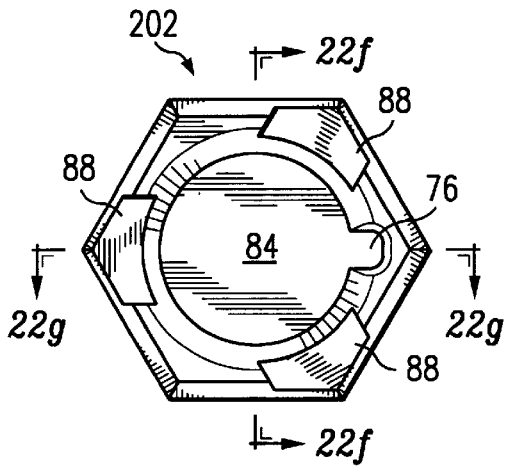
FIG. 22b is a top view thereof.
Figure 22C:
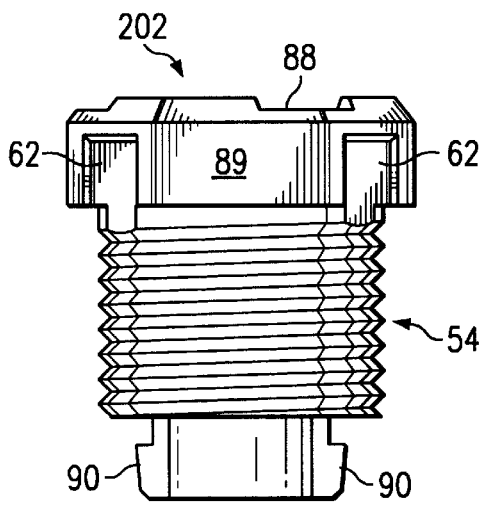
FIG. 22c is a front view thereof.
Figure 22D:
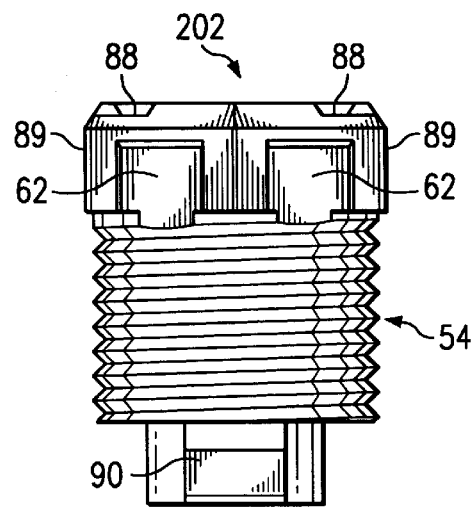
FIG. 22d is a side view thereof.
Figure 22E:
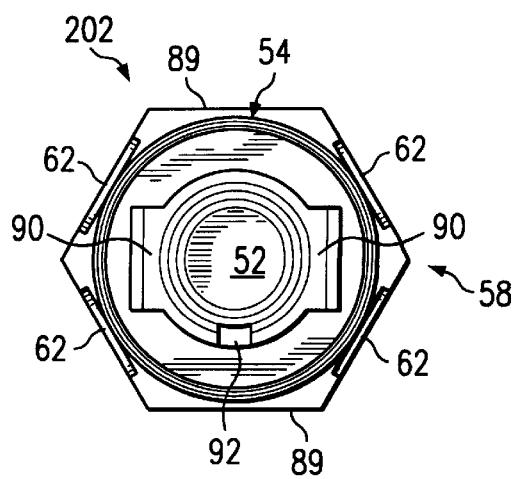
FIG. 22e is a bottom view thereof.
Figure 22F:
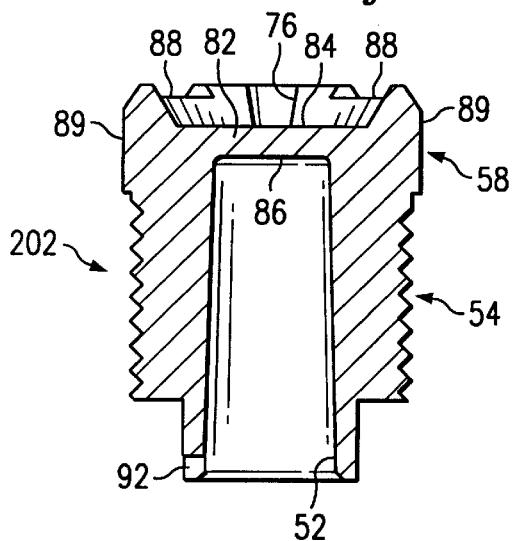
FIG. 22f is a cross-sectional view taken along line 22f—22f in FIG. 22b.
Figure 22G:
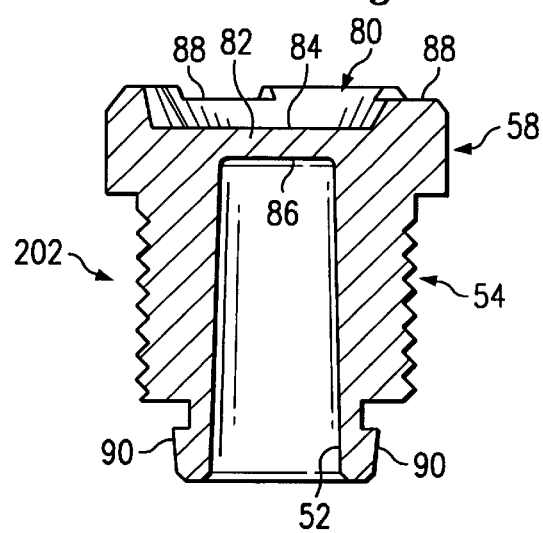
FIG. 22g is a cross-sectional view taken along line 22g—22g in FIG. 22b.

Referring now to FIG. 21, a liquid level gauge including gauge sub-assembly 200 and dial assembly 226 is shown installed in a cylindrical LPG storage tank 228. The storage tank 228 is a pressure vessel having a cylindrical tank wall 230 centered around an elongate axis 232. The outside diameter, d, of tank 228 is measured perpendicular to the elongate axis 232. The tank shown in FIG. 21 has a diameter, d, of approximately 41 inches, however, a liquid level gauge according to the current invention can be used in storage tanks and pressure vessels having a diameter in the range from about 24 inches to about 42 inches including other standard size tanks having diameters of 30 inches, 31.5 inches, 37 inches and 40.5 inches. For purposes of further description, shown in dashed lines in FIG. 21 is a circle, denoted by referenced numeral 235, having a radius 0.5×d representing the cross-section of the tank 228 if viewed along the elongate axis 232. A pressure fitting 234 is provided on the upper portion of tank wall 230 for installation of the liquid level gauge along a line perpendicular to the elongate axis 232. In the embodiment shown, the pressure fitting 234 is an internally threaded fitting welded to the tank wall 230. In many regions, the size of the threaded pressure fitting 234 has been standardized with a minimum internal diameter of about 1.13 inches.

The liquid level gauge is installed in the tank 228 by first passing the float arm assembly 225, support arm 204 and other in-tank components of the gauge through the threaded pressure fitting 234 and then screwing the gauge head 202 into the pressure fitting until a pressure-tight seal is obtained and the float arm 218 is oriented to move in the desired direction. It is common practice to orient the float arm 218 so that it moves in a plane offset about 30° from the elongate axis 232, however it will be readily apparent that other orientations can be used provided there is no interference from the tank walls or from other tank fittings. While threaded pressure fittings are the most common method of installing liquid level gauges in LPG tanks, it will be readily apparent that other pressure-tight fittings known in the art, for example, flanged fittings with gaskets, could be used without departing from the scope of the current invention.

Referring still to FIG. 21, the liquid level gauge is shown installed in the tank 228 with the float 220 positioned at the 5% full level of the tank, indicated by the dashed line at reference numeral 236 (approximately 4 inches from the bottom in a tank having a diameter of 41 inches). As the liquid level rises and falls in the tank, the float 220 remains at the surface of the liquid causing the float arm assembly 225 to pivot correspondingly around pivot axis 248. For example, when the liquid is at the 80% full level of the tank, indicated by the dashed line at reference numeral 238 (approximately 30 inches from the bottom in a tank having a diameter of 41 inches), the float arm assembly (shown in phantom for this position) will be at the position indicated by reference numeral 240. Between the 5%, full level 236 and the 80%) full level 238, the float arm 218 (and thus also the float assembly 225) moves through an angle, denoted by reference letter ar, that defines the normal working range of the gauge. An intermediate position (again shown in phantom) for the float arm assembly is shown at reference numeral 242 and an empty position for the float arm assembly (again shown in phantom) is indicated at reference numeral 244. Note that in the empty position shown at reference numeral 244, the float arm 218 does not hang vertically downward, (vertical is indicated by the dashed line at reference numeral 243), but rather remains at an angle, indicated by reference letter $a_k$, with respect to vertical. This kickoff angle, $a_k$, is maintained to ensure that the float 220 does not reach bottom dead center (indicated by reference numeral 246) directly below the float arm axis 248 as this could cause the gauge to malfunction.

As previously discussed, it is important that the in-tank portions of the gauge, especially the float arm assembly 225, have adequate clearance from the inside surfaces of the tank 228 during installation and operation. Referring still to FIG. 21, the dashed circle 235 represents the dimensions of a cross-section of tank 228 if viewed along the elongate axis 232. Circle 235 can thus be used to visualize the position of the in-tank components of gauge in terms of their clearance with the inner walls of the tank when the float swings in a plane perpendicular to the elongate axis 232. As previously discussed, gauges are typically installed such that the float arm swings in a plane offset about 30° from the elongate axis 232, however, the aforementioned situation with the arm swinging perpendicular to the elongate axis can occur if gauge 200 is spun rapidly during installation such that centrifugal force causes the float arm to rotate from the empty position 244 toward the 90° (with respect to vertical) position (not shown). Dashed line 250 illustrates the arc traveled by the radially outermost portion of float 220 as it moves from the empty position 244 to the 80%) full level 240. The point (denoted by reference numeral 252) at which float travel arc 250 intersects tank cross-section circle 235 indicates where the float 220 will strike the interior of the tank 228 if the gauge is turned rapidly. The float arm angle with respect to vertical at the point of intersection 252 is known as the free-swing angle and is denoted by reference letter $a_s$. In a preferred embodiment of the current invention, the free-swing angle $a_s$ is at least about 25°. In a more preferred embodiment, the free-swing angle $a_s$ within the range from about 34° to about 50°.

The free-swing angle $a_s$ is largely determined by the working length of the support arm 204 (i.e., the distance from the top of the support arm to the pivot axis 248) denoted by reference letter s (FIG. 21), and the maximum length of the float arm assembly 225 (i.e., the distance from the pivot point 248 to the radially farthest point on the float 220) denoted by reference letter f (FIG. 21). When the working length s of the support arm 204 is selected such that it places the pivot point 248 within 0.5×d of the tank bottom and the maximum length f of the float arm assembly is selected to provide clearance at the bottom of the tank, then the float travel arc 250 generally does not intersect with the tank wall, and the swing angle $a_s$ can be greater than 90° (it is then governed only by the internal travel stops of the gauge). However, if the working length s of the support arm 204 places the pivot point 248 too close to the tank bottom, then the float arm will not be able to accurately measure high (80%)) levels in the tank. The inverse situation is also a problem. That is, if the working length s of the support arm 204 is too short, i.e., placing the pivot point 248 significantly further than 0.5×d from the tank bottom, then a float arm having a maximum length f sufficient to measure the low (5%) levels of the tank will have insufficient free swing angle $a_s$.

For single size gauges, i.e., those for use in only one size tank, the method of choosing an appropriate support arm working length s and float arm maximum length f is well understood with s typically selected to position the pivot point 248 at about 0.5×d above the tank bottom and with f selected to be slightly less than 0.5×d. However, it is expensive and thus undesirable to manufacture and inventory many different gauges for use in tanks of various size. Although the cost of manufacturing and inventorying different sized float arm assemblies may be acceptable due to their relative simplicity, the manufacturing and inventorying of different gauge support assemblies (i.e., the gauge sub-assembly less the float arm assembly 225) is still undesirably expensive since the gauge support assembly includes the most expensive portions of the gauge, for example the gauge head, the support arm, the gear mechanism and magnet drive shafts, and requires the most assembly. Thus it has long been a goal of gauge designers to design a single gauge support assembly which can be used to make gauge sub-assemblies and gauges for use in a variety of different sized tanks by subsequently connecting the proper float arm assembly and indicator dial to the gauge support assembly. Efforts in this field have led to numerous designs incorporating adjustable length support arms or gauge support assemblies as previously discussed. However, the design of a fixed-length gauge support assembly which can be used in a variety of LPG tanks having sizes within the range from about 24 inches to about 42 inches in diameter has heretofore eluded gauge designers. The unique aspects of the current invention include an embodiment comprising a single fixed-length gauge support assembly which can be combined with one of a selected group of float arm assemblies and indicator dial assemblies to form a screw-in gauge which is suitable for use in LPG tanks having a range of sizes from about 24 inches to about 42 inches in diameter, which provides adequate internal clearance during installation and operation, and which provides a high resolution magnetically-coupled indication of the liquid level.

Figure 8:
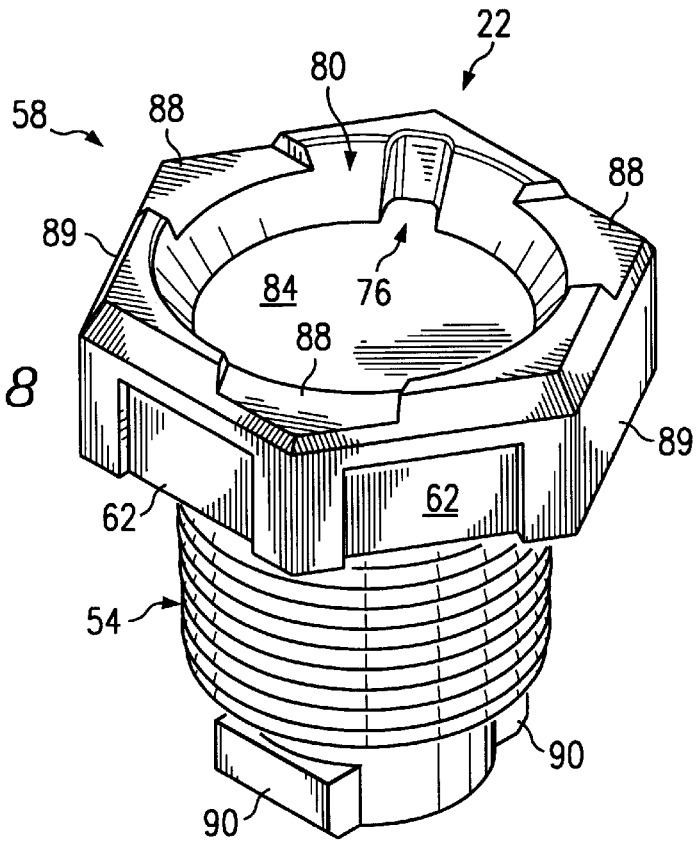
FIG. 8 is a perspective view of a preferred embodiment of the gauge head of the current invention.
Figure 9:
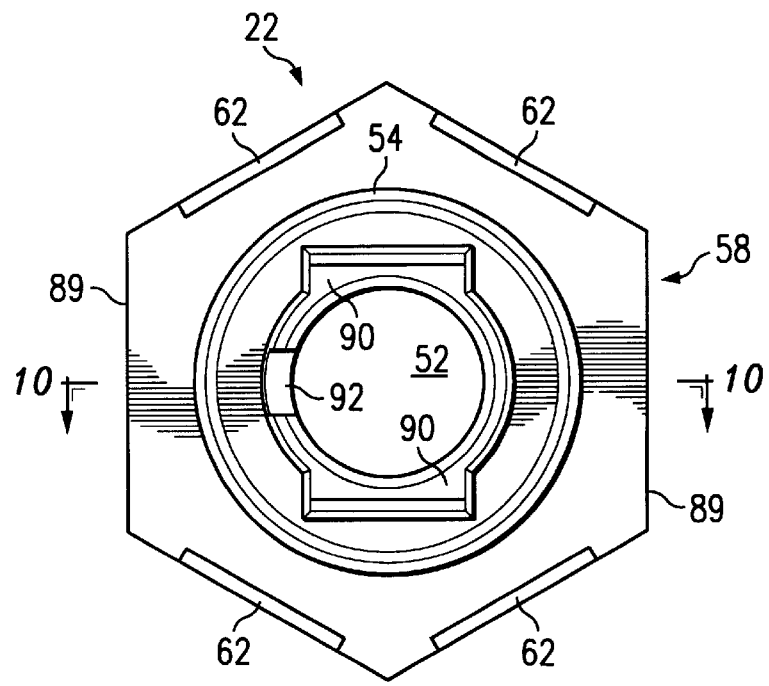
FIG. 9 is a bottom view of the gauge head of FIG. 8.
Figure 10:
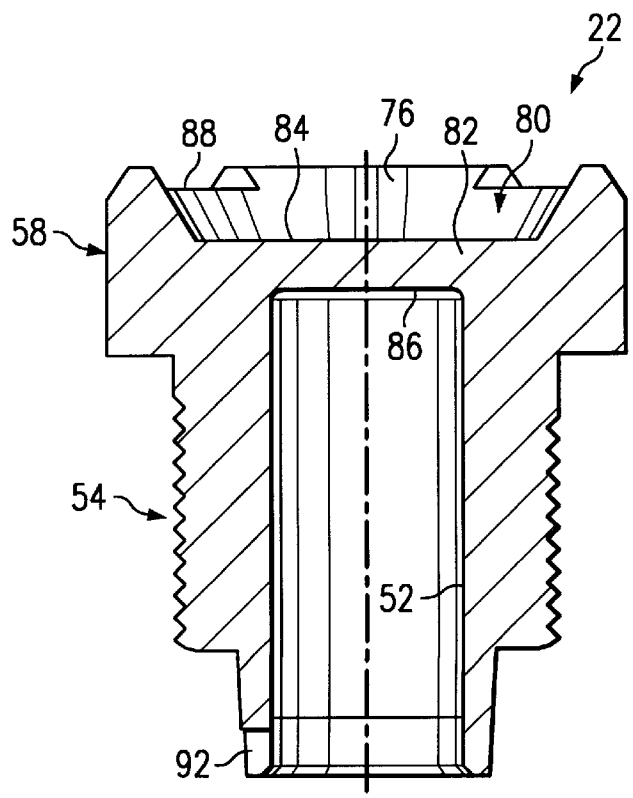
FIG. 10 is a cross-sectional view of the gauge head taken along line 10—10 of FIG. 9.

Referring now to FIGS. 22a–22g, the gauge head 202 of the preferred embodiment is substantially similar in form and material to the gauge head 22 previously discussed and shown in FIGS. 8–10, although the proportions of the gauge head 202 can be adapted as shown in FIGS. 22a–22g to meet the dimensional requirements for pressure fittings used on standard LPG tanks. To avoid repetition, features common to the gauge heads 22 and 202 are designated with like reference numbers and are not described again. While the gauge head 202 of the preferred embodiment utilizes threads 54 to provide a pressure-tight seal with the threaded fitting 234 of the storage tank shown in FIG. 21, it will be apparent that gauge heads using a bolted flange (not shown) or other pressure-tight attachment structure known in the art can be used on the gauge head of the current invention when the storage tanks involved are equipped with an alternative pressure fitting structure.

Further, while the gauge head 202 of the preferred embodiment includes recesses 62 which can interfit with the snap-on feet 60 of dial indicators 34 and 226, it will also be apparent that the gauge heads of the current invention can have other dial attachment configurations known in the art, for example recessed portions of the gauge head which can interfit with differently shaped attachment tabs on an indicator dial (to provide an index feature) and threaded passages which can receive attachment screws which have passed through the attachment tabs.

Figure 23:
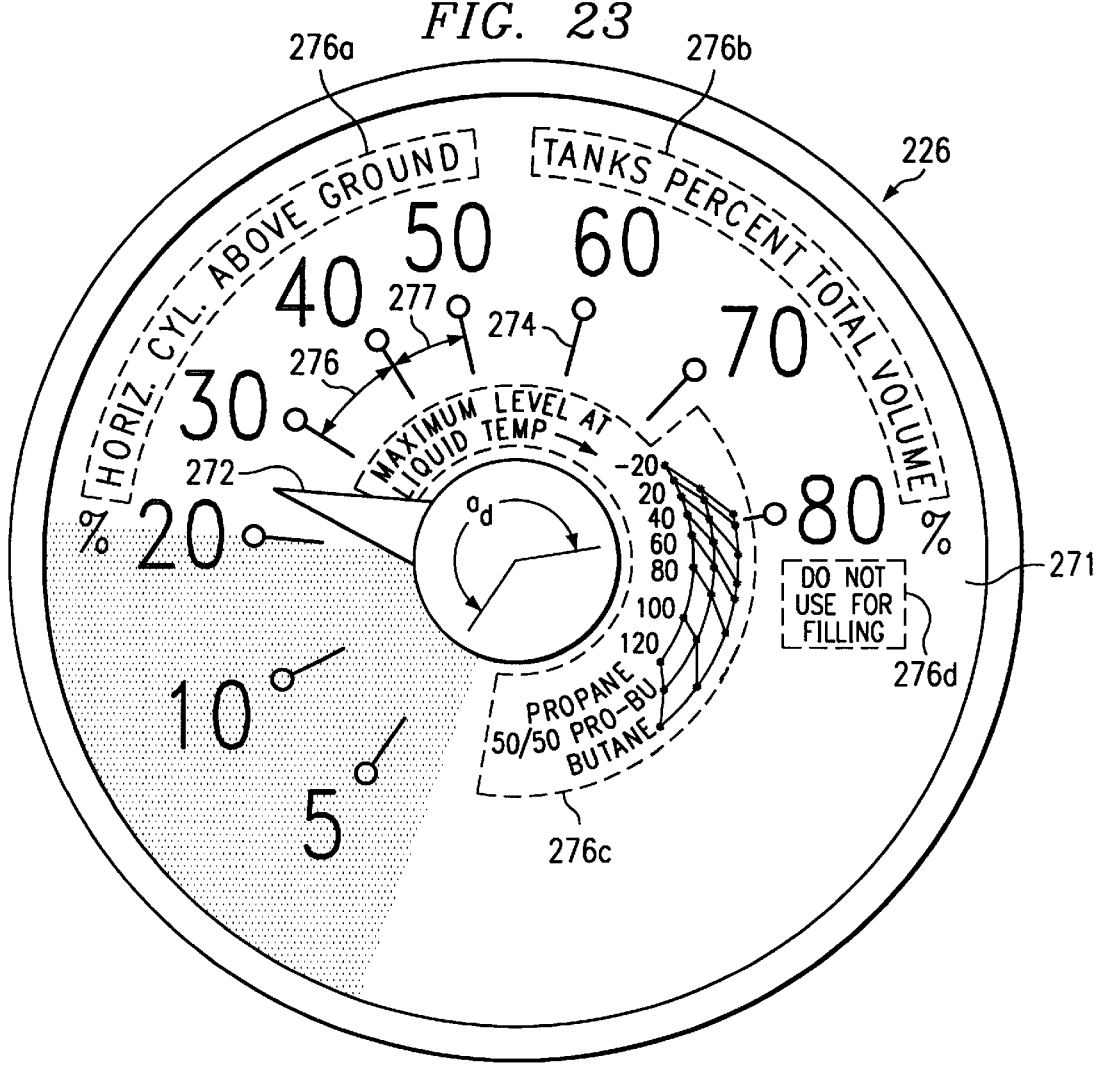
FIG. 23 is a top view of the indicator dial of the current invention.

Referring again to FIG. 21 and now also to FIGS. 6, 7 and 23, the magnetically-coupled indicator dial assembly 226 can have a plurality of snap-on feet 60 and an index tab 78 for securing and aligning the dial assembly 226 to the recesses 62 and index slot 76 of the gauge head 202 in a manner substantially identical to that previously described for dial assembly 34 (FIGS. 6 and 7)and gauge head 22 (FIGS. 8–10). The dial assembly 226 can have a receiving magnet 64, an indicia plate 271 and a pointer 272 which are sealed inside a non-magnetic case 67 as is known in the art such that the receiving magnet 64 and the pointer 272 rotate together. When the dial assembly 226 is attached to the gauge head 202, the receiving magnet 64 of the dial assembly is proximate to the upper surface 84 of the gauge head wall 82 while the drive magnet 210 is proximate to the lower surface 86 of the gauge head wall 82. Since the wall 82 is non-magnetic, the magnetic field of magnet 210 extends through the wall. The receiving magnet 64 in dial assembly 226 is magnetically urged to align its magnetic field with that of the magnet 210, thereby causing the receiving magnet 64 and the connected pointer 272 (and/or other indicating mechanisms) to rotate to an angular position corresponding to the angular position of the float arm assembly 225, and hence also to the level of liquid in the tank 228.

While the indicator dials 34 and 226 of the preferred embodiments shown in FIGS. 6,7, and 23 include snap-on attachment feet 60 which can interfit with the recesses 62 on the gauge head 202, it will be apparent that the indicator dial of the current invention can have other attachment structures known in the art without departing from the scope of the current invention. For example, one dial configuration, known as a "screw-on" dial, includes differently shaped alignment tabs which can interfit with corresponding recesses in the top of the gauge head. The dial is then held in place with screws running through the tabs and into the gauge head.

Referring still to FIG. 23, the indicator dial assembly 226 of the preferred embodiment provides a high resolution indication of the liquid level within the tank 228, i.e., where the angular distance, $a_d$, between the 5% full mark and the 80% full mark on the gauge dial is at least 180°. An indicia plate 271 is provided which is visible from the top side of dial assembly 226. Level indicia marks 274 are provided on visible portions of plate 271 at angular positions corresponding to the positions occupied by the pointer 272 for selected liquid levels within tank 228. For example, in the embodiment shown in FIG. 23, level indicia marks 274 are provided at positions representing the position of pointer 272 for liquid levels corresponding to 5%, 10%, 20%, 30%, 40%, 50%, 60%, 70%, and 80% of the tank's total volume remaining. Note that the angular placement of the level indicia marks 274 on the indicia plate 271 takes into account the nonlinear relationship between the liquid height and the remaining volume of liquid in a cylindrical tank, and also the nonlinear relationship between the float arm angular position and the float vertical height. As a result, the angular distance between different pairs of adjacent level indicia marks may vary even though the change in percent tank volume is the same. For example, the angular distance between the 30% and 40% level indicia marks (denoted by reference number 276) is greater than the angular distance between the 40% and 50% level indica marks (denoted by reference numeral 277), even though each distance represents the same change in remaining tank volume. The indicia plate 271 can further include advisory indicia providing information to the user, for example, specifying appropriate tank configuration (reference numeral 276a), identification of level indicia format (reference numeral 276b), temperature/LPG mix adjustment charts (reference numeral 276c), and user cautions (reference numeral 276d).

By providing indicator dial assemblies 226 having different indicia plates 271, gauges 200 according to the current invention can be assembled using identical gauge stub assemblies with fixed-length support arms 204 which can accurately measure liquid levels in different size LPG tanks having diameters ranging from about 24 inches to about 42 inches, even though the angular range $a_r$ of the float arm assemblies 225 can vary for tanks of different diameter. However, if the float arm range $a_r$ for some tanks in this size range is less than 90° (see, e.g., FIG. 21), providing a high resolution indication of liquid level, that is, where $a_d$ on dial assembly 226 is at least 180°, requires that the gear ratio between the gear portion 214 of pivot arm 212 and the drive shaft gear 207 must be greater than 2:1, and preferably within the range from 2.0:1 to about 2.5:1.

Referring now to FIGS. 24a–24e, details of the support arm 204 are shown. The support arm 204 is similar in some respects to the previously described support arm 24 shown in FIGS. 11a–15. For example, in the embodiment shown in FIG. 24a, the support arm 204 is a one-piece assembly produced from injection molded acetal plastic. Other plastics, such as polyester, or other materials such as metals, could be used, however. In addition, while a one-piece assembly is preferred, multiple-piece assemblies can be used without departing from the scope of the current invention.

In the preferred embodiment, the support arm 204 has a fixed working length s (FIG. 21) within the range from about 10.5 inches to about 14 inches. In a more preferred embodiment, the fixed working length s is within the range from about 11.0 inches to about 12.0 inches. A support arm 204 having a fixed length as described can be used in a gauge, a gauge sub-assembly or a gauge support assembly suitable for use in a cylindrical tank having a diameter within the range from about 24 inches to about 42 inches.

The support arm 204 comprises an upper portion 254 for attachment to the gauge head 202, a lower portion 256 for attachment to the pivot arm 212 which connects the float arm assembly 225, and a middle portion 258 for supporting the magnet drive shaft assembly. The support arm 204 is connected to the gauge head 202 by means of at least one latching member 260. To facilitate easy attachment of the support arm 204 to the gauge head 202, in the preferred embodiment two latching members 260 are provided which are adapted to snap fit over the mounting tabs 90 (see, e.g., FIG. 22b) of the gauge head 202.

To facilitate the alignment of the support arm 204 and the gauge head 202, and to provide additional structural strength to the joint therebetween, support arm 204 can also include an internal support member 262 which is adapted to fit within the tubular passage 52 (see, e.g., FIG. 22g) of the gauge head 202. The internal support member 262 may take the form of a slotted cylinder as shown by member 263 in FIG. 23d. The internal support member can also be formed from two or more partially cylindrical members (similar to those numbered 104a and 104b in FIG. 11c) which provide the desired internal support and, at the same time, allow simplified tooling for injection molding. In yet another alternative embodiment shown in FIG. 24e, the support member 262 can be a full cylindrical boss 264 which provides further strength to the joint between the support arm 204 and gauge head 202. The increased strength and stiffness provided by a full cylindrical support member is of particular importance where relatively long support arms or float arm assemblies are used or where the gauge will be installed in the tank before it is transported to its final destination. To further ensure proper alignment of the support arm 204 with the gauge head 202, an alignment key (similar to key 108 shown in FIG. 11b) can be provided which interfits into the index slot 92 (FIG. 22f) in the lower portion of the gauge head.

Referring still to FIGS. 24a and 24b, an important aspect of the support arm 204 which facilitates ease of assembly and low parts count in the current invention is the sideways-securing shaft channel 209 formed by the middle portion 258 of the support arm along the longitudinal axis 265. The term "sideways-securing" refers to the structure of the support arm 204 having shaft securing elements along the shaft channel 209 which allow a drive shaft assembly (e.g., 206, 208) to be laterally secured in place by moving it in a sideways motion, i.e., a motion in a direction generally perpendicular to the longitudinal axis 265. In the embodiment shown in FIGS. 24a–24e, the shaft securing elements include shaft bearings 278 which are located in laterally-spaced-apart pairs along the shaft channel. As best seen in FIG. 24b, the lateral spacing between shaft bearings 278 in each pair can be selected such that a drive shaft 206 can be snap-fit between the bearings as it is moved sideways into shaft channel 209 toward longitudinal axis 265. It will be readily understood that the snap-fitting of the shaft 206 into the shaft channel includes an initial interference or blocking between the shaft and the bearings 278 as the shaft is moved sideways in shaft channel 209 toward the axis 265 and into contact with the bearings. Further sideways movement of the shaft toward the axis 265 (which may require significant force) causes a deflection of the shaft, bearings and/or support arm structure such that the shaft passes between the bearings. A final interference-free fit results when the shaft 206 is moved further into the shaft channel past the bearings 278 and into alignment with longitudinal axis 265. The aforementioned final fit is interference-free only in the sense that the bearings 278 allow unrestricted rotational motion of shaft 206 when it is aligned with the axis 265; the bearings will, of course, resist any lateral motion of the shaft 206. Thus, the bearings 278 secure the shaft assembly in the shaft channel 209.

If the support arm 204 has a slotted support member, for example, support member 263 in the embodiment shown in FIG. 24d, then the drive shaft assembly 206, 208 can be inserted into the shaft channel 209 with a purely sideways motion, as with the side-accessible shaft channel discussed in previous embodiments of the invention. If, however, the support arm 204 has a full cylindrical support member, for example, support member 264 in the embodiment shown in FIG. 24e, then the drive shaft 206 is installed in a different manner as follows: First, the upper drive shaft 206 is inserted from the top of support arm 204 through the passage 267 formed through support member 264 and with the shaft being directed at a slight angle (with respect to longitudinal axis 265) as it exits the passage. The angle will allow the shaft 206 to be positioned adjacent to the securing bearings 278 but on the opposite side of the bearings from longitudinal axis 265. Next, the shaft 206 is longitudinally positioned at the desired location with respect to channel 209, typically by aligning grooves or flanges on the shaft with corresponding features on the channel. Finally, the shaft 206 is secured in the shaft channel 209 by moving it sideways into the channel toward the longitudinal axis 265 until it is engaged by the sideways securing elements (in this case, bearings 278) and is aligned with the longitudinal axis.

The lower drive shaft 208 can be operably connected to the upper drive shaft 206 either before or after the upper drive shaft is secured in channel 209, depending on the interconnection elements used. The lower shaft 208 can be secured into the shaft channel 209 using a sideways movement and bearings 278 similar to those previously described. In the embodiment shown in FIGS. 25–26, the connecting pin 211a of shaft 206 can be inserted into the slot 211c of shaft 208 after the shaft 206 has been inserted through the support member (e.g., member 264 (FIG. 24e)) and then the joined shafts 206 and 208 can be concurrently moved sideways to secure them in shaft channel 209.

The sideways-securing shaft channel is a great improvement because it allows the magnet drive shaft assembly to be installed into the support arm 204 even if the drive shaft assembly has features such as flanges or connectors which are too large to slide longitudinally through the bearings along the axis 265. Instead, the shaft and its oversized components can be moved into longitudinal position adjacent to the bearings and then moved sideways to secure the shaft into place. The side-securing shaft passage also allows the use of multi-piece magnet drive shaft assemblies (e.g., 206, 208) wherein the shafts are connected to one another after at least one of the shafts has been longitudinally positioned in the shaft channel. In addition, the sideways securing shaft channel 209 allows shaft bearings 278, 280 to be formed as an integral part of support arm 204 rather than requiring them to be separate parts.

As best seen in FIG. 24b, in the preferred embodiment the sideways securing shaft channel 209 is formed by the U-shaped combination of side walls 282 and back wall 284 that form the middle portion 258 of the support arm 204. To provide additional structural support and rigidity, in the preferred embodiment, the middle portion 258 of the support arm 204 further comprises longitudinal support members 286 attached to the outer portion of side walls 282. In embodiment shown in FIGS. 24a and 24b, the support members 286 form holes 288 to reduce material usage without significantly affecting the rigidity of the support arm 204. It will be readily apparent that other configurations for the middle portion of the support arm can be used to provide the sideways securing drive shaft channel without departing from the scope of the current invention.

The lower portion 256 of the support arm 204 is adapted for pivotal connection to the pivot arm 212 (FIGS. 27a–27d). In a preferred embodiment, the bottom portion 256 forms a passage 270 for receiving a pivot pin or axle 288 (FIGS. 27a–27d) of the pivot arm 212; however, it is apparent that the relative locations of the axle 288 and passage 270 on the support arm 204 and pivot arm 212 can be reversed. In the preferred embodiment, axle 288 is retained in passage 270 by the subsequent attachment of retainer 289, however, other retaining mechanisms could be used as previously described or known in the art. To control the overall travel of the float arm assembly and maintain the kickoff angle $a_k$, an internal float stop is provided on the pivot arm 212 and the support arm 204. As previously discussed, the float stop is considered internal where its components are not exposed on the outside surface of the gauge, thus minimizing the possibility that the float stop mechanism will be contaminated by any debris within the tank. In a preferred embodiment, the internal float stop comprises a keyway 290 (FIG. 24a) that is formed on support arm 204 in a partial arc surrounding axle passage 270 to interfit with a key 292 (FIGS. 27b–27d) formed on the pivot arm 212. In this preferred embodiment, lower portion 256 also forms a shaft gear passage 294 allowing the pinion gear 207 clearance to turn freely when the shaft assembly has been installed in shaft channel 209.

Referring now to FIGS. 27a–27d, the pivot arm 212 of the current invention has several unique features adapted to meet the requirements of LPG tank service. As previously described, the pivot arm 212 includes a spur gear portion 214 and an arm attachment portion 216. The spur gear portion 214 includes gear teeth 304 arranged in an arc around a center point 306. The maximum radial extent of the teeth relative to center point 306 defines a maximum radius for the gear. The gear ratio between the spur gear portion 214 of pivot arm 212 and the pinion gear 207 of the shaft assembly will determine the dial angle $a_d$ obtained for a float arm range angle $a_r$. To allow the desired dial angle $a_d$ of at least 180° with a range angle $a_r$ which can be 90° or less for some size tanks, the ratio between the gears 214 and 207 is preferably at least 2:1 and more preferably within the range of 2.0:1 to about 2.5:1. Consequently, the angular spacing of the teeth on the pinion gear 207 is preferably in the range of 2.0 to about 2.5 times the angular spacing of the teeth on the spur gear portion 214. For example, in the preferred embodiment, the pinion gear 207 has 6 teeth evenly spaced at approximately 60° to one another and the spur gear portion 214, if it was a full circular gear, would have 15 teeth evenly spaced at approximately 24° to one another. However, for reasons discussed below, the spur gear portion 214 in this embodiment is not a full circular gear, but instead is a partial gear, also called a sector gear, having only 6 full teeth. However, the teeth 304 of spur gear portion 214 are arranged in an arc about center point 306 with approximately 24° spacing to one another such that the desirable gear ratio of 2.5:1 is obtained between the gears 214 and 207.

The spur gear portion 214 on the pivot arm 212 can be made with only a 6-tooth sector gear rather than a full 15-tooth circular gear because only 6 teeth of the spur gear will actually engage the pinion gear 207 as the pivot arm 212 moves through its range of motion. Any additional teeth on the spur gear portion 214 would therefore be unused. By forming the pivot arm 212 with only 6 teeth, rather than with 15, the tooling required to produce the pivot arm is simplified, resulting in a significant savings in tooling costs.

Figure 27A:
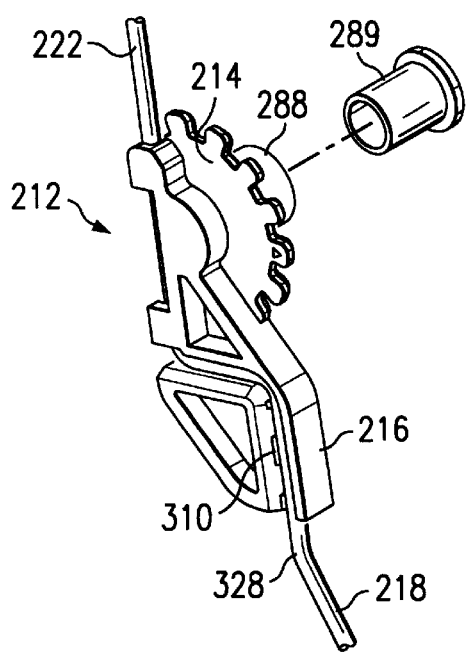
FIG. 27a is a front perspective view of the pivot arm of the sub-assembly of FIG. 20 with a portion of the float arm wire in place.
Figure 27B:
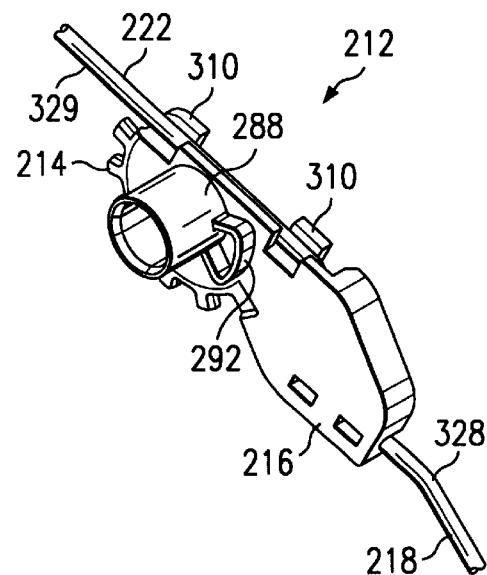
Figure 27C:
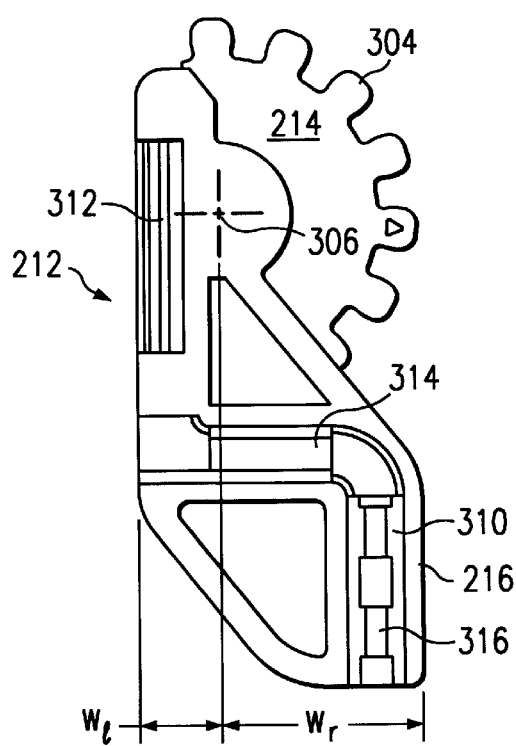
FIG. 27c is a front view thereof.
Figure 27D:
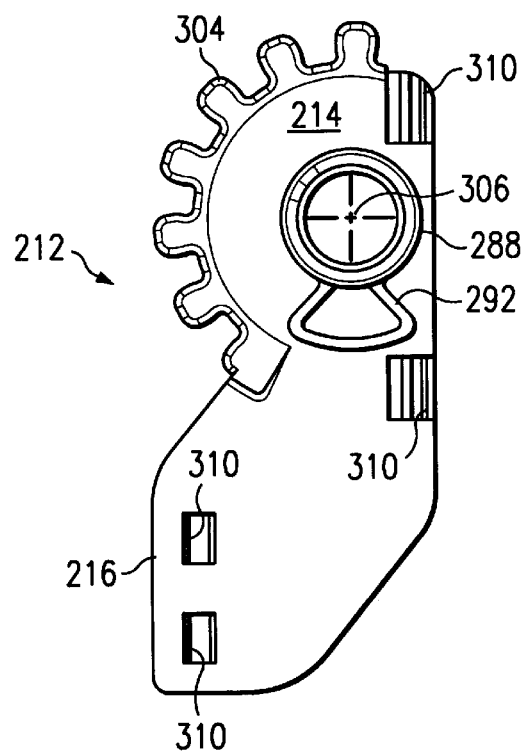
FIG. 27d is a back view thereof.

Further, the use of a full circular gear having 15 teeth formed at the same maximum radius as the teeth on the spur gear portion 214 would result in the pivot arm 212 being too large to fit through the standard 1.13 inch opening found on many LPG tanks. Thus, as best seen in FIG. 27c, the pivot arm 212 of the current invention includes a spur gear portion 214 which is not a full circle, but instead is an arc of radially arranged gear teeth, the arc having an angular extent of less than 180° and a center 306 which is laterally offset with respect to the center of the shortest lateral side of the pivot arm (i.e., the lateral distance $w_l$ from the center 306 to the left side of stub arm 212 is smaller than the lateral distance $w_r$ from the center 306 to the right side, where $w_l+w_r$ is the length of the minimum lateral dimension of the pivot arm). Thus, the gear teeth 304 on spur gear portion 214 can be sized to have a maximum radius (measured from center 306) which is significantly greater than 0.5 times the minimum lateral width ($w_l+w_r$) of the stub arm. This unique configuration allows the pivot arm 212 to have gear teeth with a robust maximum radius on gear portion 214 while still being able to pass through the standard 1.13 inch tank opening.

Another important aspect of the current invention is the support arm 204 having a lower section which is front-laterally offset with respect to the longitudinal axis 265 and which has an angled front-lateral profile. For purposes of this application, the term "front-lateral" refers to the lateral directions when viewed from the front side of the object. For example, in the support arm 204 shown in FIG. 24a, the front-lateral direction, indicated by dashed line 296, is generally perpendicular to a plane containing both the longitudinal axis 265 and the float arm pivot axis 248. As best seen in FIG. 24c, the front-lateral offset of the support arm 204 complements the offset configuration of the pivot arm 212 when the gauge is configured for installation into the tank (i.e., when the counterweight 224 is tucked up against the longitudinal support member 286). In this complementary position, the individual gear teeth 304 of gear portion 214 are protected from contacting the edges of the threaded pressure fitting 234 during installation of the gauge 200 by the greater lateral extent (denoted by reference numeral 305) of the lower portion of the support arm 204.

Referring now again to FIG. 24a, the front lateral offset of the support arm 204 is further described. FIG. 24a shows the support arm 204 without the float arm assembly. The drive shaft passage 209 of support arm 204 runs along longitudinal axis 265, terminating at the opening 294 for the shaft gear 207. The upper portion 298 of float arm 204 (the portion above dashed line 300 in FIG. 24a) has an overall lateral width $W_u$ defined by the front lateral extent of the support members 286 which are generally symmetrically arranged on both sides of the longitudinal axis 265 (each extending laterally from the axis about $0.5 \times w_u$). The lower portion 302 of the float arm (the portion below dashed line 300 in FIG. 24a) comprises a portion of the float arm middle 258 and the entire float arm bottom 256 having the pivot arm attachment passage 270. As best seen in FIG. 24a, the front lateral extent of the lower portion 302 of the float arm 204 is not symmetrically arranged around the longitudinal axis 265. Instead, the lower portion 302 is front laterally offset with respect to the longitudinal axis 265. In the example shown in FIG. 24a, the left lateral extent $w_{ls}$ adjacent to float arm pivot axis 248 is smaller than the right lateral extent $w_{rs}$. Note, however, the overall width $w_a$ of the lower portion 302 is about the same as the width $w_u$ for the upper portion 296. This front lateral offset allows the lower portion 302 of the support arm 204 to have a lateral extent on one side of the pivot axis 248 which is much greater than 0.5 times the overall width $w_a$ of the lower portion while at the same time keeping $w_a$ approximately equal to $w_u$ (the overall width of the upper portion). This allows the lower portion 302 to provide protection for the offset gear portion 214 of the stub arm 212 (when in the installation position) while still allowing the assembled gauge 200 to fit through the opening in the pressure fitting 234 having a diameter only slightly larger than $w_u$.

The lower portion 302 of the support arm 204 also has an angled front lateral profile with respect to upper portion 296. The centerline of lower portion 302, denoted by dashed line 303, forms an angle $a_o$ with the longitudinal axis 265. In the preferred embodiment, $a_o$ is about 7°. The angled front lateral profile of lower portion 302 allows the support arm 204 to be smoothly inserted through the narrow opening of pressure fitting 234 during installation without catching or binding.

Referring again to FIGS. 27a–27d, another important aspect of the current invention is the attachment portion 216 of the stub arm 212. In the preferred embodiment, the attachment portion 216 has snap-in fastening features 310 adapted to flex open as a wire such as float arm 218 is inserted therein and then close to securely retain the wire in place. In addition, the attachment portion 216 includes at least two fastening features 310 having wire guide paths which are non-collinear or disposed at an angle to one another. This prevents the round float arm wire 218 from rotating relative to the stub arm 212 after installation without requiring any set screws or other supplemental holding devices. In the preferred embodiment shown in FIGS. 27a–27d, three fastening features 310 are provided having wire guide paths 312, 314 and 316, respectively, positioned with approximately 90° angles between each subsequent guide path to form a "z" shaped path for wire 218. As best seen in FIG. 28b, the float arm wire 218 has a corresponding "z" shaped section, designated by reference numeral 318, which can be snapped into the fastening features 310 of the pivot arm.

Referring now to FIGS. 25 and 26, in the preferred embodiment, the drive shaft assembly is a multi-piece assembly comprising an upper magnet drive shaft 206 and a lower magnet drive shaft 208 which are connected together such that torque can be transmitted between the two drive shafts. The upper magnet drive shaft 206 includes the magnet holder 205 at its upper end 206a and the lower magnet drive shaft 208 includes the gear portion 207 at its lower end 208b. The drive shafts 206, 208 can further include axial alignment members 206c, 208c, respectively, which keep the drive shafts from shifting axially within the drive shaft channel 209. Such axial shifting could put undesirable pressure on the gears 207, 214 or move the magnet 210 from its proper position. While any type of axial shaft alignment structure known in the art can be used for the alignment members, in the preferred embodiment shown in FIG. 25 the alignment members 206c, 208c are raised flanges which interfit with corresponding grooves formed along the sides of alignment channel 209 on the support arm 204.

Referring now still to FIGS. 25 and 26, the lower end 206b of the upper magnet drive shaft 206 and the upper end of 208a of the lower magnet drive shaft 208 include connecting members (best seen in FIG. 26) which can be interconnected to one another such that torque can be transmitted from one drive shaft to the other while permitting limited axial movement of the adjacent shaft ends 206b, 208a with respect to one another. Even though the support arm 204 has a fixed length, the use of a multi-piece drive shaft assembly allowing axial movement between the adjacent ends of drive shafts 206, 208 is of considerable practical benefit as it allows dimensional variation in the length of the individual drive shaft components to occur without biasing the outer drive shaft ends 206a, 208b to move from their nominal positions (as fixed by the axial alignment members). Any bias on the outer drive shaft ends 206a, 208b to move from their nominal positions can cause binding of the alignment members 206c, 208c against the support arm 204 which can considerably increase the operating torque and accuracy of the gauge. Dimensional variation can occur either due to variations in manufacturing of the shafts 206, 208 and/or support arm 204, or due to thermal expansion and/or contraction of these components which can occur when the gauge is exposed to temperature extremes in service. In the preferred embodiment shown in FIGS. 25 and 26, the connecting members comprise a pin 211a which projects from a first half-shaft section 211b on upper shaft end 206b to interfit with a slot 211c formed in a second half-shaft section 211d on lower shaft end 208a. The members 211a and 211c are initially interconnected by lateral relative movement which can be accomplished prior to installation into the support arm 204 through the sideways securing shaft channel 209. The pin 211a can transmit torque to the sides of the slot 211c while remaining free to move axially. It will be readily apparent, of course, that other connecting mechanisms known in the art for the transmission of torque between shafts while allowing limited axial movement, for example, splined shafts, telescoping circular shafts with an index key, and telescoping polygonal tubular members, could be used for the connecting members without departing from the scope of the current invention.

Figure 28A:
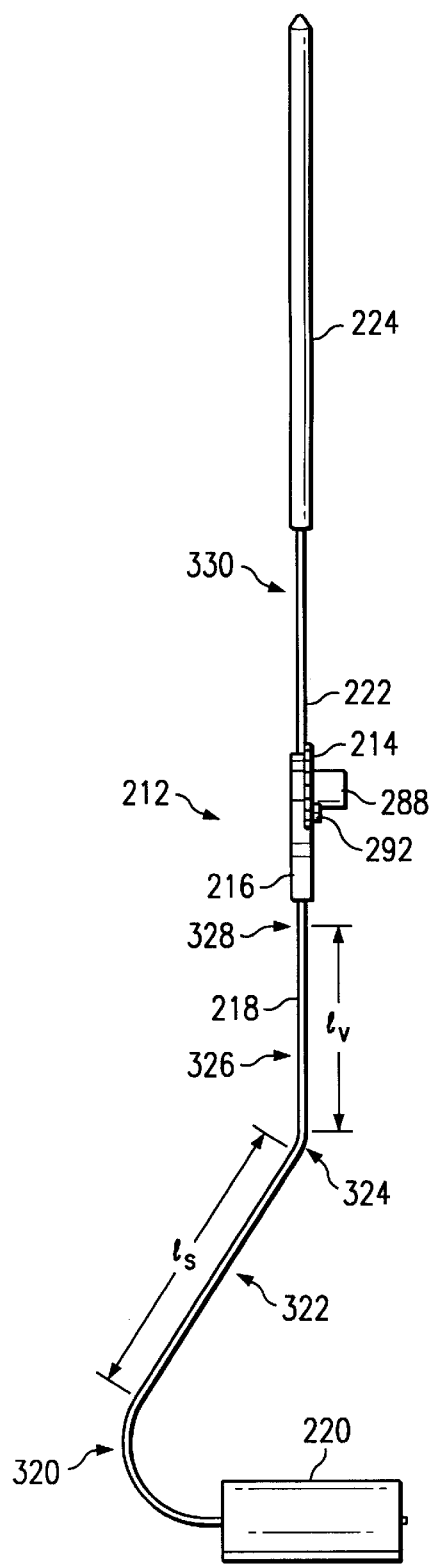
FIG. 28a is a scale front view of a pivot arm and float assembly of the sub-assembly of FIG. 20, for use in a standard LPG tank having a diameter of 24 inches.
Figure 28B:
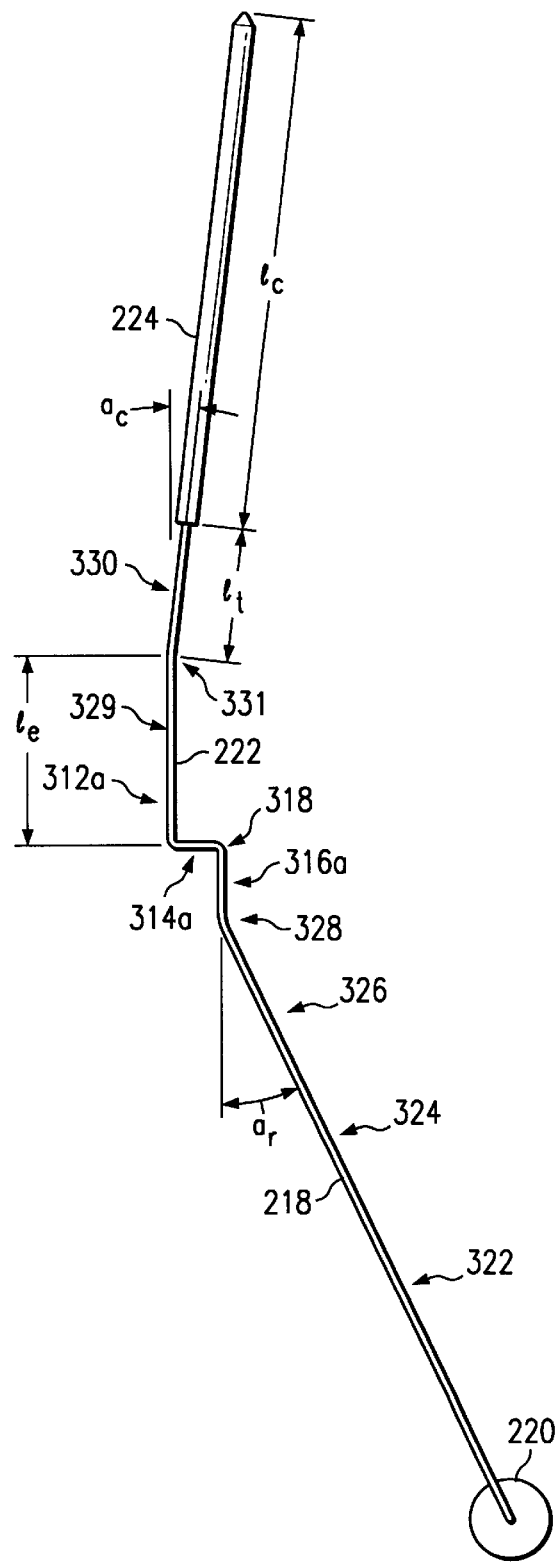
FIG. 28b is a scale right side view thereof with the pivot arm removed for clarity.

Referring now to FIGS. 28a–28b, another aspect of the current invention is the configuration of the float arm 218 and counterweight wire 222 (if used). In the preferred embodiment, the float arm 218 and the counterweight arm 222 are formed from an integral piece of wire, however, it will be understood that the arms 218 and 222 can be formed separately and joined, for example, at pivot arm 212, and that the counterweight arm 222 can be omitted under certain circumstances. As previously discussed, the exact dimensions of the float arm wire used in LPG tanks having diameters in the range of about 24 inches to about 42 inches will vary. However, the current invention utilizes a standard float arm/counterweight arm configuration having defined parameters which can be specified to adapt the float arm assembly 225 to fit a specific size tank having a diameter of about 24 inches to about 42 inches while the remaining components of the gauge 200, including the support arm 204 and the pivot arm 212, remain unchanged.

The float 220 is buoyant in LPG and provides sufficient buoyancy to remain at the surface of the liquid when connected to the float arm 218. In the preferred embodiment, the float 220 is formed of solid (i.e., not hollow) nitrile rubber foam, however, it will be readily apparent that the float can be formed of other materials including plastics, metal and cork, and in other configurations including hollow, as is known in the art provided the overall dimensions of the float arm assembly do not change significantly.

FIGS. 28a–28b show a scale view of a float arm assembly suitable for use in a 24-inch diameter tank where the working length s of the support arm 204 is within the range of about 11 to 12 inches. For reference purposes, the float 220 in FIGS. 28a–28b is approximately 1.1 inches in diameter and approximately 2.5 inches in length. The portion of float arm 218 extending from the float 220 has a first section 320 (FIG. 28a) having a large radius curve necessary to allow float arm 218 to follow the float 220 through the narrow opening of the threaded pressure fitting 234. In the preferred embodiment, the large radius curve 320 has a radius of at least about one inch. The curved section 320 of wire 218 is integrally connected to a first straight section 322 having a fixed length, $l_s$, for all tank sizes. In the preferred embodiment, the length $l_s$ of first straight portion 322 is within the range of about 5 inches to about 6 inches. The first straight section 322 is integrally connected by first bend 324 to a second straight section 326 having a length $l_v$. In a preferred embodiment for 24 inch tanks, length $l_v$ is about 3 inches for 24 inch tanks. In other embodiments for tanks having a diameter from about 24 inches to about 42 inches, length $l_v$ is within the range from about 3 inches to about 21 inches. As best seen in FIG. 28b, second straight section 326 is bounded on the lower side by the first bend 324 and bounded on the upper side by a second bend 328 which is positioned just outside the attachment portion 216 of pivot arm 212. Viewed from the front, the second straight section 326 of float arm 218 also forms an angle $a_v$ with a line constituting an extension of the section (denoted by 316a) extending from fastening feature 310 of the stub arm 212 along support path 316. In the preferred embodiment for 24 inch tanks, angle $a_v$ is about 21°. In other embodiments for tanks having a diameter from about 24 inches to about 42 inches, angle $a_v$ is within the range from about 21° to about 0°. After second bend 328, float arm 218 sequentially forms sections 316a, 314a and 312a corresponding in shape to the wire guide paths 316, 314 and 312, respectively, of pivot arm 212. These three sections, collectively denoted as the "z" shaped section 318, have the same dimensions for all embodiments of float arm 218 such that a common pivot arm 212 can be used for all size tanks. After exiting the z-shaped section 318, the wire, now referred to as counterweight arm 222, first forms a third straight section 329 constituting an extension of section 312a and having a length le which is fixed for all size tanks. In the preferred embodiment $l_e$ is within the range of about 2 inches to about 3 inches, measured from the last 90° bend in section 318. In a more preferred embodiment, le is about 2.6 inches. The upper end of section 329 is bounded by a third bend 331. The third bend 329 connects to a tail section 330 which allows attachment of the counterweight 224. As best seen in FIG. 28b, the tail section 330 forms an angle $a_c$ with a line constituting an extension of tail third straight segment 329. The angle $a_c$ is fixed for all size tanks and allows the counterweight 224 to fit snugly against the support arm 204 during installation. In the preferred embodiment, angle $a_c$ is about 7°. The length it of the tail segment 330 and the length $l_c$ of the counterweight 224 are selected, based on the composition of the counterweight, to provide the force necessary to adequately supplement the buoyancy of floats 220 as known in the art.

Thus, there is disclosed a float-type liquid level gauge that overcomes the shortcomings and disadvantages of the prior art liquid level gauges. While the foregoing embodiments of the invention have been disclosed with reference to a specific gauge structure, it is to be understood that many changes in detail may be made as a matter of design choices, without departing from the spirit and scope of the invention, as defined by the appended claims.

We claim:

1. A gauge support assembly for use with a magnetically driven indicating dial assembly and a float arm assembly to measure the level of a liquid inside a horizontally oriented cylindrical pressure vessel having a diameter within the range of about 24 inches to about 42 inches, said gauge support assembly comprising:
   a) a gauge head having a lower portion defining a passage formed on its lower surface and a dial assembly mounting portion formed on its upper surface;
   b) a support arm having an longitudinal axis, an upper end connected to said lower portion of said gauge head, a pivot arm attachment portion being located at a first distance from said upper end, and a middle portion extending between said upper end and said pivot arm attachment portion;
      said middle portion defining a sideways-securing shaft channel extending between said upper end and said pivot arm attachment portion along said longitudinal axis;
   c) a magnet drive shaft assembly rotatably mounted in said shaft passage and having a magnet holder located at an upper end and a pinion gear located at a distance from said upper end;
      said upper end of said shaft assembly extending beyond said upper end of said support arm and positioning said magnet holder within said passage of said gauge head;
   d) a magnet being secured to said magnet holder of said magnet drive shaft;
   e) a pivot arm being pivotally connected to said pivot arm attachment portion of said support arm, and having a spur gear portion and a float arm attachment portion;
      said spur gear portion including a plurality of gear teeth arranged in an arc around a center point, said teeth having a maximum radius from said center point;
      said float arm attachment portion having at least one fastening feature for securely connecting a float arm assembly to said pivot arm;
   said spur gear portion operably engaging said pinion gear to impart rotational motion to said shaft, said magnet holder and said magnet relative to said support arm and said gauge head upon the angular movement of said pivot arm relative to said support arm.

2. A gauge support assembly according to claim 1, wherein said gauge head is adapted for screw-in connection to an internally threaded pressure fitting.

3. A gauge support assembly according to claim 2, wherein said gauge head is adapted for snap-on connection of a magnetically coupled indicator dial.

4. A gauge support assembly according to claim 2, wherein said gauge head is adapted for screw-on connection of a magnetically coupled indicator dial.

5. A gauge support assembly according to claim 2, wherein all of the constituent components of said support assembly except said gauge head can pass through a circular passage having a diameter within the range from about 1.1 inches to about 1.3 inches.

6. A gauge support assembly according to claim 2, wherein all of the constituent components of said support assembly except said gauge head can pass through an internally threaded pressure fitting having a passage with a diameter of about 1.13 inches.

7. A gauge support assembly according to claim 2, wherein the gear ratio between said spur gear portion of said pivot arm and said pinion gear is at least 2:1.

8. A gauge support assembly according to claim 7, wherein the gear ratio between said spur gear portion of said pivot arm and said pinion gear is within the range of 2.0:1 to about 2.5:1.

9. A gauge support assembly according to claim 7, wherein said spur gear portion of said pivot arm is formed of a molded plastic material.

10. A gauge support assembly according to claim 7, wherein said float arm attachment portion of said pivot arm is adapted for snap-in connection of a float arm assembly.

11. A gauge support assembly according to claim 10, wherein said attachment portion has a first wire guide portion for snap-in connection and alignment of a first portion of said float arm assembly along a first line and a second wire guide portion for snap-in connection and alignment of a second portion of said float arm assembly along a second line, said first and second lines being non-collinear.

12. A gauge support assembly according to claim 7, wherein said pivot arm is a unitary component formed of a molded plastic material.

13. A gauge support assembly according to claim 12, wherein said plastic material is acetal plastic.

14. A gauge support assembly according to claim 7, wherein said pivot arm further comprises an integral internal float stop adapted to interfit with a keyway formed on said support arm such that the range of motion of the pivot arm relative to the support arm is restricted to a predetermined arc.

15. A gauge support assembly according to claim 7, wherein said magnet drive shaft assembly is a unitary component formed of a molded plastic material.

16. A gauge support assembly according to claim 7, wherein said magnet drive shaft assembly comprises an upper drive shaft including said magnet holder and a lower drive shaft including said pinion gear.

17. A gauge support assembly according to claim 16, wherein said magnet holder is integrally formed with said upper drive shaft and said pinion gear is integrally formed with said lower drive shaft.

18. A gauge support assembly according to claim 17, wherein said magnet holder is adapted for snap-fit connection of said magnet.

19. A gauge support assembly according to claim 1, wherein said spur gear portion of said pivot arm comprises a plurality of gear teeth arranged in an arc about a center which is laterally offset with respect to the center of the shortest lateral side of the pivot arm, said arc of teeth having an overall angular extent of less than about 180°.

20. A gauge support assembly according to claim 19, wherein said pivot arm attachment portion of said support arm has, when viewed from the front side, a leftmost extent and a rightmost extent defining a lateral width therebetween, and said attachment portion defines an axle passage for receiving a pivot arm pivot axle;

said axle passage defining a pivot axis for said pivot arm;
said pivot axis being front laterally offset on said attachment portion such that a first distance from the pivot axis to one of said leftmost extent and said rightmost extent is greater than a second distance to another of said leftmost extent and said rightmost extent.

21. A gauge support assembly according to claim 20, wherein said teeth of said spur gear portion have a maximum radial distance from said arc center which is greater than 0.5 times the lateral width, measured through the pivot axis, of said pivot arm attachment portion of said support arm.

22. A gauge support assembly according to claim 21, wherein said teeth of said spur gear portion have a maximum radial distance from said arc center which is greater than about 0.56 inches and a maximum lateral width less than about 1.13 inches.

23. A gauge support assembly according to claim 1, wherein said support arm is a unitary component formed of a molded plastic material.

24. A gauge support assembly according to claim 23, wherein plastic material is acetyl plastic.

25. A gauge support assembly according to claim 1, wherein said support arm further comprises a support member formed on the upper end of said support arm and adapted to fit within said passage on the lower side of said gauge head.

26. A gauge support assembly according to claim 25, wherein said support member of said support arm comprises a generally cylindrical boss formed around said longitudinal axis and having at least one slot formed through the side of said boss.

27. A gauge support assembly according to claim 25, wherein said support member of said support arm comprises a continuous cylindrical boss formed around said longitudinal axis.

28. A gauge support assembly according to claim 1, wherein said gauge head is adapted for bolted connection to a flanged pressure fitting.

29. A gauge support assembly according to claim 28, wherein said gauge head is adapted for snap-on connection of a magnetically coupled indicator dial.

30. A gauge support assembly according to claim 28, wherein said gauge head is adapted for screw-on connection of a magnetically coupled indicator dial.

31. A gauge sub-assembly for use with a magnetically-coupled indicator dial for measuring the level of a liquid inside a horizontally oriented cylindrical pressure vessel having a diameter within the range of about 24 inches to about 42 inches, said gauge sub-assembly comprising:

a gauge support assembly according to claim 1; and
a float arm assembly connected to said pivot arm.

32. The gauge sub-assembly of claim 31, wherein said float arm assembly further comprises:

a float buoyant in LPG; and
a float arm including a z-shaped center section, a float arm section and a counterweight section;
said center section comprising a first, second and third straight sections separated by a first and second 90° angles and being adapted to interfit with the attachment portion of said pivot arm;
said float arm section extending between said center section and said float; and
said counterweight section extending between said center section and a counterweight.

33. The gauge sub-assembly of claim 32, wherein said float arm section further comprises:

a curved section extending from said float, said curved section constituting, when viewed from the side, a curve having a radius of curvature of at least one inch, and being connected to a first straight section, said first straight section having a length within the range of about 5 inches to about 6 inches and being connected to a first bend, said first bend being connected to a second straight section having a length within the range from about 3 inches to about 21 inches, said second straight section being bounded on a first side by said first bend and bounded on a second side by a second bend, said second bend being connected to said first straight section of said z-shaped center section, said second straight section forming, when viewed from the front, an angle within the range of about 21° to about 0° with respect to a line constituting an extension of said first straight section of the z-shaped center section connected to said second bend.

34. The gauge sub-assembly of claim 32, wherein said counterweight arm section further comprises:

a third straight section constituting an extension of said third straight section of the z-shaped center section, said third straight section having a length within the range of about 2 inches to about 3 inches, measured from the last 90° bend in said center section, and being connected to a third bend, said third bend being connected to a tail section for attachment of the counterweight, said tail section forming, when viewed from the front, an angle of about 7° with a line constituting an extension of said third straight segment; and a counterweight attached to said third straight segment.

35. A gauge for measuring the level of a liquid inside a horizontally oriented cylindrical pressure vessel having a diameter within the range of about 24 inches to about 42 inches, said gauge comprising:

a gauge sub-assembly according to claim 31; and
a magnetically driven indicating dial.

36. The gauge of claim 35, wherein said indicating dial is adapted for snap-on connection to said gauge head.

37. The gauge of claim 36, wherein said dial produces a visual indication of the position of the magnet.

38. The gauge of claim 37, wherein said dial also produces a non-visual signal indicating the position of the magnet, said non-visual signal suitable for remote sensing.

39. The gauge of claim 35, wherein said indicating dial is adapted for screw-on connection to said gauge head.

40. A gauge for measuring the level of LPG inside a horizontally oriented cylindrical storage tank having a diameter within the range of about 24 inches to about 42 inches, said gauge comprising:

a) a gauge head having a lower portion defining a passage formed on its lower surface and a dial assembly mounting portion formed on its upper surface;

b) a magnetically coupled indicator dial attached to said dial assembly mounting portion of said gauge head;

c) a support arm having an longitudinal axis, an upper end connected to said lower portion of said gauge head, a pivot arm attachment portion being located at a first distance from said upper end, and a middle portion extending between said upper end and said float arm attachment portion, said first distance being within the range of about 10.5 inches to about 14 inches;

said middle portion defining a sideways-securing shaft channel extending between said upper end and said pivot arm attachment portion along said longitudinal axis;

d) a magnet drive shaft assembly rotatably mounted in said shaft passage and having a magnet holder located at an upper end and a pinion gear located at a distance from said upper end;

said upper end of said shaft extending beyond said upper end of said support arm and positioning said magnet holder within said passage of said gauge head;

e) a magnet being secured to said magnet holder of said magnet drive shaft assembly;

f) a pivot arm being pivotally connected to said pivot arm attachment portion of said support arm, and having a spur gear portion and a float arm attachment portion;

said spur gear portion including a plurality of gear teeth arranged in an arc around a center point and having a maximum radial distance from said center point;

said float arm attachment portion having at least one fastening feature for securely connecting a float arm assembly to said pivot arm;

g) a float arm assembly including a float buoyant in LPG and a float arm including a z-shaped center section, a float arm section and a counterweight section;

said center section comprising a first, second and third straight sections separated by a first and second 90° angles and being adapted to interfit with the attachment features of said pivot arm;

said float arm section extending between said center section and said float and further comprising a curved section extending from said float, said curved section constituting, when viewed from the side, a curve having a radius of curvature of at least one inch, and being connected to a first straight section, said first straight section having a length within the range of about 5 inches to about 6 inches and being connected to a first bend, said first bend being connected to a second straight section having a length within the range from about 3 inches to about 21 inches, said second straight section being bounded on a first side by said first bend and bounded on a second side by a second bend, said second bend being connected to said first straight section of said z-shaped center section, said second straight section forming, when viewed from the front, an angle within the range of about 21° to about 0° with respect to a line constituting an extension of said first straight section of the z-shaped center section connected to said second bend;

said counterweight section extending between said center section and a counterweight and further comprising a third straight section constituting an extension of said third straight section of the z-shaped center section, said third straight section having a length within the range of about 2 inches to about 3 inches, measured from the last 90° bend in said center section, and being connected to a third bend, said third bend being connected to a tail section for attachment of the counterweight, said tail section forming, when viewed from the front, an angle of about 7° with a line constituting an extension of said third straight segment, and a counterweight attached to said third straight segment;

wherein said spur gear portion of said pivot arm engages said pinion gear to impart rotational motion to said shaft, said magnet holder and said magnet relative to said support arm and said gauge head upon angular movement of said pivot arm relative to said support arm.

41. A method of assembling a gauge support assembly for use with a magnetically driven indicating dial assembly and a float arm assembly, said method comprising the steps of:

a) providing a support arm having a longitudinal axis, an upper end having a generally cylindrical support member projecting therefrom along said longitudinal axis and having a passage formed therethrough along said longitudinal axis, a pivot arm attachment portion being located at a first distance from said upper end, and a middle portion extending between said upper end and said pivot arm attachment portion;

said middle portion defining a sideways-securing shaft channel extending between said support member and said pivot arm attachment portion along said longitudinal axis;

said sideways-securing shaft channel having a plurality of securing members formed therealong;

said pivot arm attachment portion being, when viewed from the front side, front-laterally offset with respect to said longitudinal axis and having a leftmost extent and a rightmost extent defining a lateral width therebetween, and said attachment portion defining an axle passage for receiving a pivot arm pivot axle;

said axle passage defining a pivot axis for said pivot arm pivot axle;

said pivot axis being front laterally offset on said attachment portion such that a first distance from the pivot axis to one of said leftmost extent and said rightmost extent is greater than a second distance to the other of said leftmost extent and said rightmost extent such that said pivot axis intersects said longitudinal axis of said support arm;

b) providing a magnet drive shaft assembly;

c) inserting at least a portion of said drive shaft assembly downwardly and at an angle with respect to said longitudinal axis through said passage in said support member such that said shaft portion is positioned adjacent to said securing members of said shaft channel but on the opposite side of said securing members from said longitudinal axis, d) positioning said shaft portion longitudinally at a desired location with respect to said channel; and e) securing said shaft portion in said shaft channel by moving it sideways into said shaft channel toward the longitudinal axis until it is secured by said securing members.

* * * * *